US012525192B2

(12) United States Patent

Kim et al.

(10) Patent No.: US 12,525,192 B2

(45) Date of Patent: Jan. 13, 2026

(54) GATE DRIVING CIRCUIT, DISPLAY PANEL AND DISPLAY APPARATUS

(71) Applicant: LG DISPLAY CO., LTD., Seoul (KR)

(72) Inventors: Haksu Kim, Gyeonggi-do (KR); YoungKyu Shin, Gyeonggi-do (KR); SeongWook Choi, Gyeonggi-do (KR)

(73) Assignee: LG Display Co., Ltd (KR)

(*) Notice: Subject to any disclaimer, the term of this patent is extended or adjusted under 35 U.S.C. 154(b) by 0 days.

(21) Appl. No.: 18/226,950

(22) Filed: Jul. 27, 2023

(65) Prior Publication Data

US 2024/0038177 A1 Feb. 1, 2024

(30) Foreign Application Priority Data

Jul. 28, 2022 (KR) ........................ 10-2022-0093903

(51) Int. Cl.

*G09G 3/3266* (2016.01)
*G09G 3/3225* (2016.01)

(52) U.S. Cl.

CPC ......... *G09G 3/3266* (2013.01); *G09G 3/3225* (2013.01); *G09G 2300/0819* (2013.01); *G09G 2300/0852* (2013.01); *G09G 2310/08* (2013.01)

(58) Field of Classification Search

CPC ............... G09G 3/3266; G09G 3/3677; G09G 2310/0286; G09G 2310/0267

See application file for complete search history.

(56) References Cited

U.S. PATENT DOCUMENTS

| | | | | |
|---|---|---|---|---|
| 2008/0143706 A1* | 6/2008 | Kim | G11C 19/28 | 345/76 |
| 2011/0090184 A1* | 4/2011 | Yamazaki | H03K 17/161 | 257/59 |
| 2011/0102398 A1* | 5/2011 | Han | G09G 3/3225 | 327/108 |
| 2011/0284881 A1* | 11/2011 | Shikina | G09G 3/3233 | 257/E27.121 |

(Continued)

FOREIGN PATENT DOCUMENTS

| | | |
|---|---|---|
| CN | 112542131 A | 3/2021 |
| CN | 112825239 A | 5/2021 |

(Continued)

OTHER PUBLICATIONS

Extended European search report dated Oct. 13, 2023 issued in Patent Application No. 23188410.7 (13 pages).

(Continued)

*Primary Examiner* — Yuzhen Shen

(74) *Attorney, Agent, or Firm* — Fish & Richardson P.C.

(57) ABSTRACT

A gate driving circuit includes a first mode controller configured to output a first emission signal based on at least one of a potential of a first node and a potential of a second node to a first output line in response to reception of a first mode signal, a second mode controller configured to output a second emission signal based on at least one of the potential of the first node and the potential of the second node to a second output line in response to reception of the second mode signal, and a node controller configured to control the potential of the first node and the potential of the second node by using at least one of a start signal, a first clock signal and a second clock signal.

24 Claims, 16 Drawing Sheets

(56) References Cited

U.S. PATENT DOCUMENTS

| | | | | |
|---|---|---|---|---|
| 2012/0139978 | A1 * | 6/2012 | Ikeda | G09G 3/3233 345/694 |
| 2015/0048333 | A1 * | 2/2015 | Choi | H10K 50/858 257/40 |
| 2018/0006099 | A1 * | 1/2018 | Ka | G09G 3/3233 |
| 2019/0066604 | A1 | 2/2019 | Kong et al. | |
| 2020/0394960 | A1 | 12/2020 | Yuan et al. | |
| 2021/0193020 | A1 | 6/2021 | Ka et al. | |
| 2022/0114969 | A1 | 4/2022 | Wang et al. | |
| 2022/0172680 | A1 | 6/2022 | Yu et al. | |
| 2023/0186849 | A1 * | 6/2023 | Chai | G09G 3/3266 345/204 |
| 2023/0393432 | A1 * | 12/2023 | Joseph | G02F 1/133608 |

FOREIGN PATENT DOCUMENTS

| | | | |
|---|---|---|---|
| JP | 2007219486 | A | 8/2007 |
| JP | 2007225738 | A | 9/2007 |
| TW | 202006694 | A | 2/2020 |
| WO | 2011145174 | A1 | 11/2011 |

OTHER PUBLICATIONS

Taiwanese Office Action dated Mar. 29, 2024 issued in Patent Application No. 112127832 (8 pages).

Japanese Office Action dated May 27, 2024 issued in Patent Application No. 2023-122269 (6 pages).

* cited by examiner

GATE DRIVING CIRCUIT, DISPLAY PANEL AND DISPLAY APPARATUS

CROSS-REFERENCE TO RELATED APPLICATION

This application claims the priority of Korean Patent Application No. 10-2022-0093903 filed on Jul. 28, 2022, which is hereby incorporated by reference on its entirety.

BACKGROUND

Field of the Disclosure

The present disclosure relates to a gate driving circuit providing a signal for control of a pixel circuit including a plurality of light emitting elements and a display panel and a display apparatus comprising the gate driving circuit.

Description of the Background

With the advancement of technologies in the modern society, a display apparatus has been used in various forms to provide users with information. The display apparatus is also included in various electronic devices, which check a user input and require higher technologies to provide information to correspond to the checked input, as well as an electronic display board that simply transfers visual information in one direction.

For example, the display apparatus may be included in a vehicle to provide various kinds of information to a driver and a passenger of the vehicle. However, the display apparatus of the vehicle needs to properly display contents so as not to disturb driving of the vehicle. For example, the display apparatus needs to limit a display of contents which may degrade concentration on driving during driving of the vehicle.

SUMMARY

Accordingly, the present disclosure is directed to a gate driving circuit, a display panel and a display apparatus that substantially obviate one or more of problems due to limitations and disadvantages described above.

More specifically, the present disclosure is to provide a gate driving circuit providing a signal for control of a pixel circuit including a plurality of light emitting elements and a display panel and a display apparatus comprising the gate driving circuit.

Also, the present disclosure is to provide a gate driving circuit providing a signal to a pixel circuit controlling a viewing angle of a display apparatus in accordance with a mode by using a plurality of light emitting elements and a display panel and a display apparatus comprising the gate driving circuit.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other advantages and in accordance with the present disclosure, as embodied and broadly described, a gate driving circuit includes a first mode controller configured to output a first emission signal based on at least one of a potential of a first node and a potential of a second node to a first output line in response to reception of a first mode signal, a second mode controller configured to output a second emission signal based on at least one of the potential of the first node and the potential of the second node to a second output line in response to reception of a second mode signal, and a node controller configured to control the potential of the first node and the potential of the second node by using at least one of a start signal, a first clock signal and a second clock signal.

In accordance with another aspect of the present disclosure, a display panel may comprise a plurality of pixel circuits, and a gate driving circuit configured to control driving of the plurality of pixel circuits based on supply of a first emission signal and a second emission signal to each of the plurality of pixel circuits, wherein the gate driving circuit includes a first mode controller configured to output the first emission signal based on at least one of a potential of a first node and a potential of a second node to a first output line in response to reception of a first mode signal, a second mode controller configured to output the second emission signal based on at least one of the potential of the first node and the potential of the second node to a second output line in response to reception of a second mode signal, and a controller configured to control the potential of the first node and the potential of the second node by using at least one of a start signal, a first clock signal and a second clock signal.

In accordance with another aspect of the present disclosure, a display apparatus may be disposed in at least a portion of a transport means, providing at least one content, and the display apparatus may comprise a plurality of pixel circuits, and a gate driving circuit configured to control driving of the plurality of pixel circuits based on supply of a first emission signal and a second emission signal to each of the plurality of pixel circuits, wherein the gate driving circuit includes a first mode controller configured to output the first emission signal based on at least one of a potential of a first node and a potential of a second node to a first output line in response to reception of a first mode signal, a second mode controller configured to output the second emission signal based on at least one of the potential of the first node and the potential of the second node to a second output line in response to reception of a second mode signal, and a controller configured to control the potential of the first node and the potential of the second node by using at least one of a start signal, a first clock signal and a second clock signal.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of the present disclosure, illustrate aspects of the disclosure and together with the description serve to explain various principles of the disclosure.

In the drawings.

DETAILED DESCRIPTION

Figure 1:
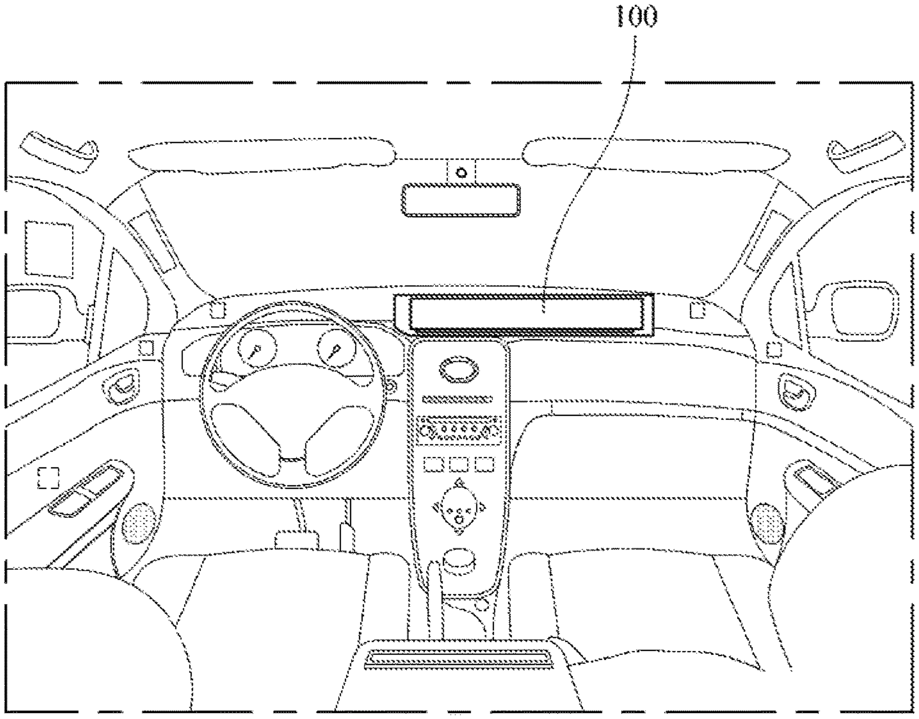
FIG. 1 is a view illustrating an example of a display apparatus according to the aspect of the present disclosure.

The term used in aspects has been selected from general terms currently widely used with consideration for functionality in this disclosure, but it may vary depending on the intent or promotion of those skilled in the art, the appearance of new technology, etc. If needed, the applicant may arbitrarily select the specific term. In this case, the meaning of the term will be described in detail in the corresponding description. Therefore, the term used in the present disclosure should be defined based on the meaning of the term and the contents throughout the disclosure, instead of the simple name of term.

When a certain part of the entire disclosure includes a certain element, this means not to exclude other components unless otherwise stated, but may further include other components.

The expression "at least one of A, B, and C" described throughout the disclosure may encompass "A alone", "B alone", "C alone", "A and B", "A and C", "B and C", or "all of A, B, and C". The advantages and features of the present disclosure, and methods of achieving them will become apparent with reference to the aspects described in detail below in conjunction with the accompanying drawings.

The shapes, sizes, ratios, angles, and numbers disclosed in the drawings for describing aspects of the present disclosure are merely examples, and thus the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted or may be briefly discussed.

In the case in which "comprise," "have", and "include" described in the present specification are used, another part may also be present unless "only" is used. The terms in a singular form may include plural forms unless noted to the contrary. In construing an element, the element is construed as including an error region although there is no explicit description thereof.

In describing a positional relationship, for example, when the positional order is described as "on," "above," "below," "beneath", and "next," etc., the case of no contact therebetween may be included, unless "direct" is used. For example, if it is mentioned that a first element is positioned "on" a second element, it does not mean that the first element is essentially or directly positioned above the second element in a figure.

It will be understood that, although the terms "first," "second," etc. may be used herein to describe various elements, these elements should not be limited by these terms. These terms are only used to distinguish one element from another and may not define any order or sequence. For example, a first element could be termed a second element, and, similarly, a second element could be termed a first element, without departing from the scope of the present disclosure.

The area, length, or thickness of each element described in the specification is illustrated for convenience of description, and the present disclosure is not necessarily limited to the area and thickness of the illustrated configuration.

Features of various aspects of the present disclosure may be partially or overall coupled to or combined with each other and may be variously inter-operated with each other and driven technically as those skilled in the art may sufficiently understand. The aspects of the present disclosure may be carried out independently from each other or may be carried out together in co-dependent relationship.

The terms which will be described later are selected from generally known and used terms considering their functions in the present disclosure, and may be modified depending on intention of a user or an operator, practices, or the like. Accordingly, the terms used herein should be defined by the description disclosed herein.

A transistor constituting a pixel circuit in the present disclosure may include at least one of an oxide thin film transistor (TFT), an amorphous silicon TFT (a-Si TFT), and a low temperature poly silicon (LTPS) TFT.

The following aspects will be described based on an organic light emitting display apparatus. However, the aspects of the present disclosure are not limited to the organic light emitting display apparatus, and may be applied to an inorganic light emitting display apparatus including an inorganic light emitting material. For example, the aspects of the present disclosure may be applied to a quantum dot display apparatus.

It will be understood that the terms such as "first," "second" and "third" are only used to distinguish one element from another element in each aspect, and the aspects are not limited by these terms. Accordingly, the same terminology may refer to different elements depending on the aspects.

Hereinafter, the aspects of the present disclosure will be described with reference to the drawings.

FIG. 1 is a view illustrating an example of a display apparatus according to one aspect of the present disclosure.

A display apparatus 100 may be disposed in at least a portion of a transport means, providing at least one content. For example, the display apparatus 100 may be disposed on at least a portion of a dashboard of a vehicle. The dashboard of the vehicle includes components disposed on a front surface of a front seat (e. g., a driver's seat and a passenger seat) of the vehicle. For example, input components for manipulating various functions (e. g., an air conditioner, an audio system and a navigation system) inside the vehicle may be disposed on the dashboard of the vehicle.

In the aspect, the display apparatus 100 may be disposed on the dashboard of the vehicle and may operate as an input unit for manipulating at least a portion of the various functions of the vehicle. The display apparatus 100 may provide various kinds of information related to the vehicle, for example, driving information (e. g., a current speed of the vehicle, a remaining fuel amount and a driving distance of the vehicle) and information (e. g., damage to a vehicle tire) on components of the vehicle.

In the aspect, the display apparatus 100 may be disposed across a driver's seat and a passenger seat, which are disposed in the front seat of the vehicle. A user of the display apparatus 100 may include a driver of the vehicle and a passenger on the passenger seat of the vehicle. That is, both the driver and the passenger of the vehicle may use the display apparatus 100.

In the aspect, only a portion of the display apparatus 100 may be shown in FIG. 1. The display apparatus 100 shown in FIG. 1 may correspond to a display panel of various elements included in the display apparatus 100. As a detailed example, the display apparatus 100 shown in FIG. 1 may represent at least a portion of a display area or a non-display area of the display panel. The elements other than portions illustrated in FIG. 1 among the elements of the display apparatus 100 may be packaged in the inside (or at least a portion) of the vehicle.

Figure 2:
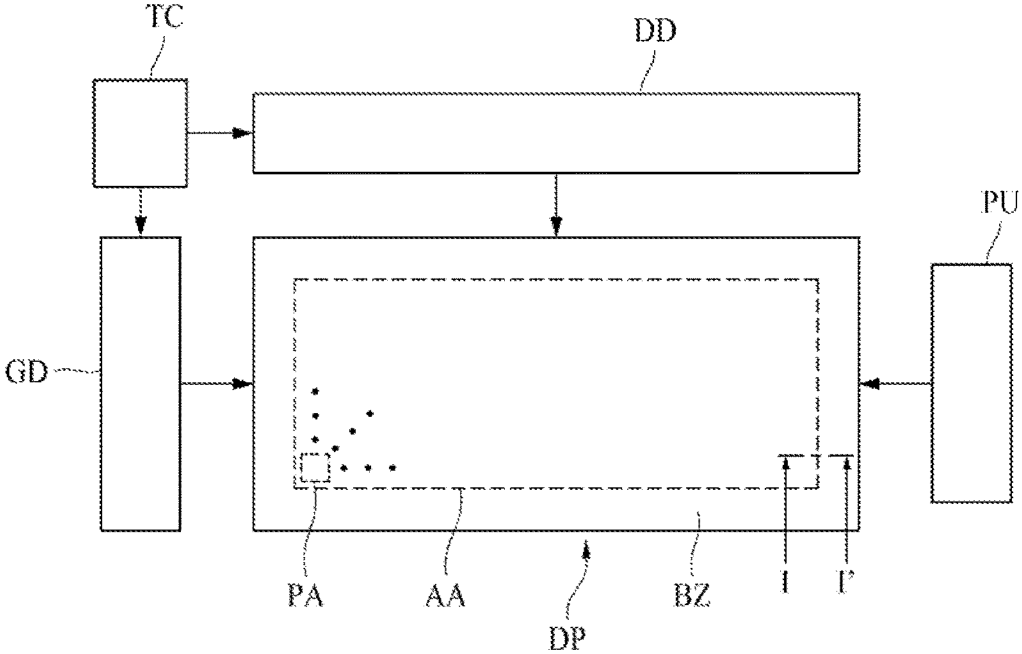
FIG. 2 is a functional block view illustrating a display apparatus according to the aspect of the present disclosure.

FIG. 2 is a functional block view illustrating a display apparatus according to the aspect of the present disclosure;

The display apparatus according to one aspect of the present disclosure may be applied with an electroluminescent display apparatus. The electroluminescent display apparatus may be an Organic Light Emitting Diode display apparatus, a Quantum-dot Light Emitting Diode display apparatus or an Inorganic Light Emitting Diode display apparatus.

Referring to FIG. 2, the display apparatus may include a display panel DP, a data driver DD, a gate driver GD, a timing controller TC and a power unit PU.

In the aspect, the display panel DP may generate an image to be provided to a user. For example, the display panel DP may generate and display an image to be provided to the user through a pixel area PA in which a pixel circuit is disposed.

Figure 3:
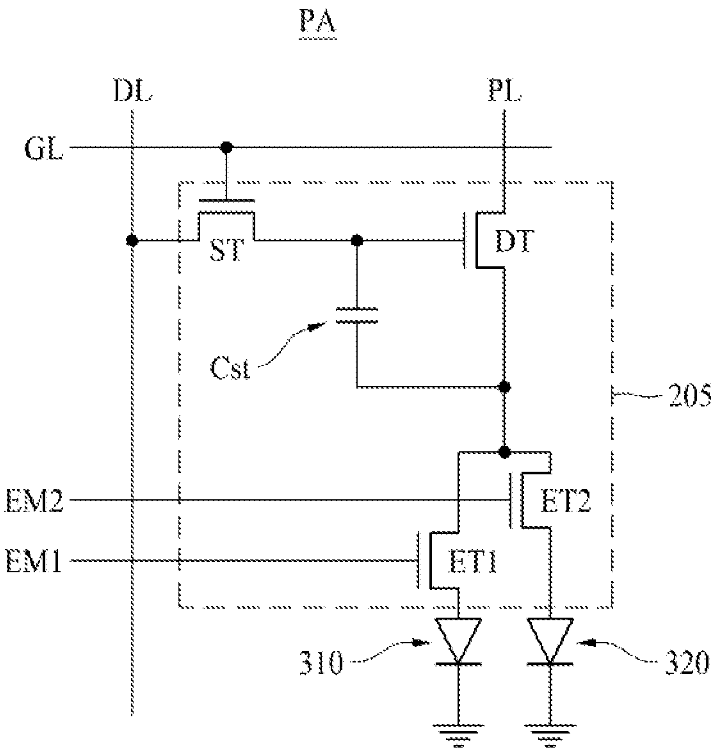
FIG. 3 is a view illustrating an example of a pixel circuit of a display apparatus according to the aspect of the present disclosure.

The data driver DD, the gate driver GD, the timing controller TC and the power unit PU may provide a signal for the operation of each pixel area PA through signal lines. The signal lines may include, for example, data lines DL, gate lines GL and power voltage supply lines PL, which are shown in FIG. 3.

For example, the data driver DD may apply a data signal to each pixel area PA through the data lines DL, the gate driver GD may apply a gate signal to each pixel area PA through the gate lines GL, and the power unit PU may supply a power voltage to each pixel area PA through the power voltage supply lines PL.

The timing controller TC may control the data driver DD and the gate driver GD. For example, the timing controller TC realigns digital video data input from the outside in accordance with resolution of the display panel DP and supplies the realigned digital video data to the data driver DD.

The data driver DD may convert the digital video data input from the timing controller TC into an analog data voltage based on a data control signal and supply the analog data voltage to the plurality of data lines.

The gate driver GD may generate a scan signal and an emission signal (or light emission control signal) based on a gate control signal. The gate driver GD may include a scan driver and an emission signal driver. The scan driver or scan output unit may generate scan signals in a row sequential manner to drive at least one scan line connected to each pixel row and supply the scan signals to the scan lines. The emission signal driver may generate emission signals in a row sequential manner to drive at least one emission signal line connected to each pixel row and supply the emission signals to the emission signal lines.

According to the aspect, the gate driver GD may be disposed on the display panel DP in accordance with a Gate-driver In Panel (GIP) method. For example, the gate driver GD may be divided into a plurality of gate driving circuits GD and then disposed on at least two sides of the display panel DP, respectively.

The display area AA of the display panel DP may include a plurality of pixel areas PA (or pixels or pixel circuits). A plurality of data lines (e. g., the data lines DL of FIG. 3) cross a plurality of gate lines (e. g., the gate lines GL of FIG. 3) in the pixel area PA, and subpixels disposed in each crossing area may be included in the pixel area PA. The respective subpixels included in one pixel area PA may emit light of their respective colors different from each other. For example, the pixel area PA may implement blue, red and green colors by using three subpixels, but is not limited thereto. The pixel area PA may further include a subpixel for further implementing a specific color (e. g., white) as the case may be.

In the pixel area PA, an area implementing blue may be referred to as a blue subpixel area, an area implementing red may be referred to as a red subpixel area, and an area implementing green may be referred to as a green subpixel area.

In the aspect, the pixel area PA may include a plurality of subpixels. Each of the plurality of subpixels may be divided into a first lens area and a second lens area, which provide their respective viewing angles different from each other. For example, the pixel area PA may include a first lens area that provides light to a first range to form a first viewing angle and a second lens area that provides light to a second range to form a second viewing angle. The first range may correspond to a range wider than the second range.

A non-display area BZ may be disposed along the periphery of the display area. Various elements for driving the pixel circuit disposed in the pixel area PA may be disposed in the non-display area BZ. For example, at least a portion of the gate driver GD may be disposed in the non-display area BZ. The non-display area BZ may be referred to as a bezel area.

FIG. 3 illustrates an example of a pixel circuit of a display apparatus according to one aspect of the present disclosure. The pixel area PA may include a plurality of subpixels representing different colors and a pixel circuit corresponding to each of the plurality of subpixels. FIG. 3 illustrates an example of a pixel circuit corresponding to one subpixel disposed in the pixel area PA.

Referring to FIG. 3, the pixel circuit may include a plurality of transistors DT, ST, ET1 and ET2, a capacitor Cst and a plurality of light emitting elements 310 and 320.

The driving transistor DT and the capacitor Cst may be connected to the switching transistor ST. A first electrode of the driving transistor DT may be connected to the power voltage supply line PL.

The switching transistor ST may be connected to the gate line GL to receive the gate signal. The switching transistor ST may be turned on or off by the gate signal. A first electrode of the switching transistor ST may be connected to the data line DL. In this case, the data signal may be supplied to a gate electrode of the driving transistor DT through the switching transistor ST in response to turn-on of the switching transistor ST.

The capacitor Cst may be disposed between the gate electrode and a second electrode of the driving transistor DT. The capacitor Cst may maintain a signal applied to the gate electrode of the driving transistor DT, for example, a data signal, for one frame.

According to the aspect, the driving transistor DT, the switching transistor ST and the capacitor Cst may be elements for driving the light emitting elements (e. g., the first light emitting diode 310 and the second light emitting diode 320), and may be referred to as driving portions, but are not limited to such terms.

The first light emitting diode (or first light emitting element) 310 may be connected to the first transistor ET1 turned on or off by a first emission signal EM1. The second light emitting diode 320 (or second light emitting element) may be connected to the second transistor ET2 turned on or off by a second emission signal EM2. The first transistor ET1 may be referred to as a first light emission control transistor. The second transistor ET2 may be referred to as a second light emission control transistor.

In this case, the first light emitting element 310 or the second light emitting element 320 may be connected to another element of the pixel circuit, for example, the driving transistor DT in accordance with a mode. The mode may be designated by a user input or may be determined when a predesignated condition is satisfied. For example, when a predesignated first condition is satisfied, the first light emitting element 310 may emit light based on the supply of the first emission signal EM1. When a predesignated second condition is satisfied, the second light emitting element 320 may emit light based on the supply of the second emission signal EM2. The first condition may include a predesignated condition for driving a first mode. The second condition may include a predesignated condition for driving a second mode.

The plurality of transistors DT, ST, ET1 and ET2 of FIG. 3 may include at least one of amorphous silicon, polycrystalline silicon and oxide semiconductor such as IGZO. A first electrode or a second electrode of the transistor may be a source electrode or a drain electrode. For example, the first electrode may be a source electrode, and the second electrode may be a drain electrode. For another example, the first electrode may be a drain electrode, and the second electrode may be a source electrode.

Figure 4:
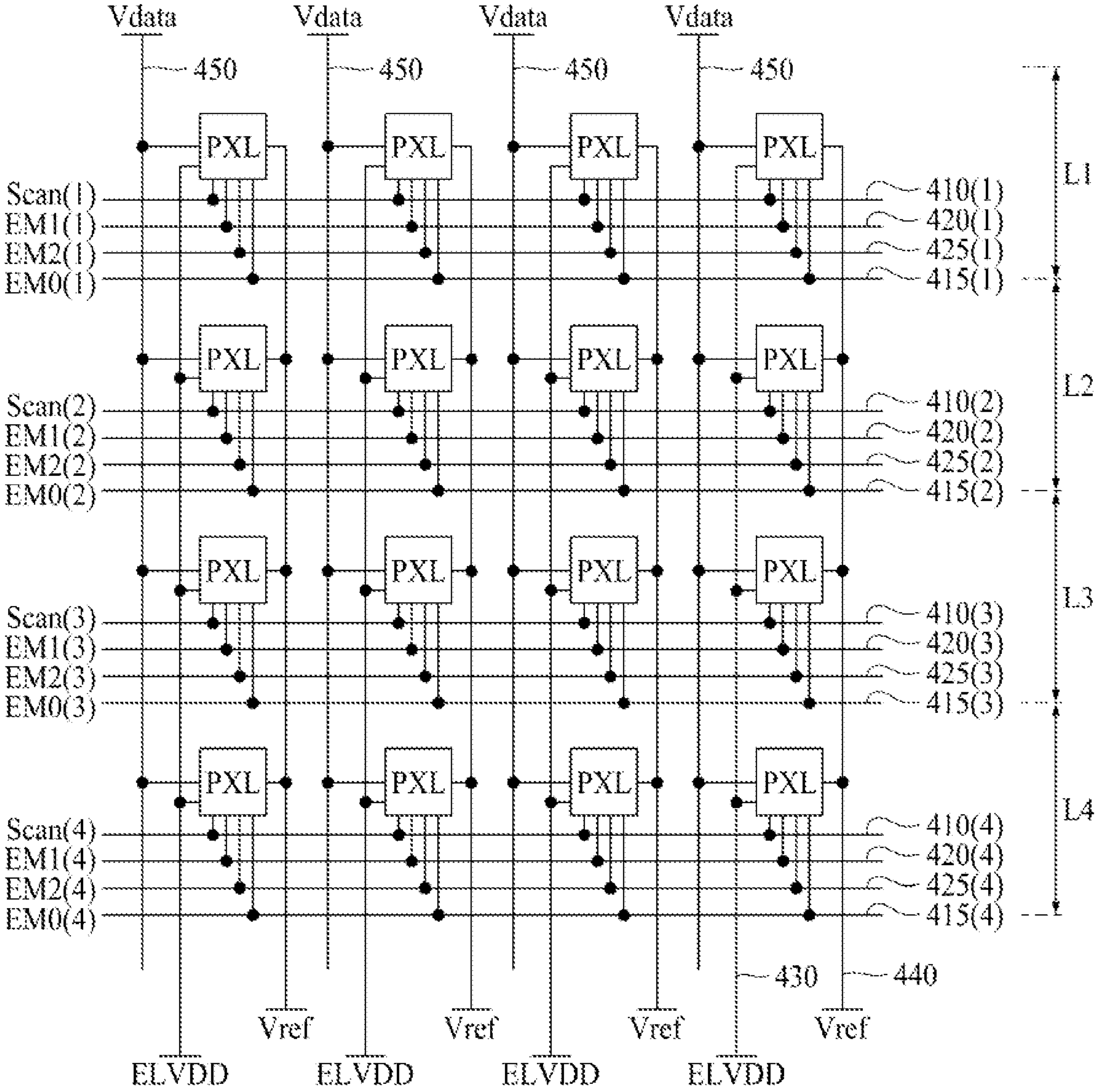
FIG. 4 is a view illustrating an example of a pixel array of a display apparatus according to the aspect of the present disclosure, in which a gate driving circuit is connected with a pixel circuit.

FIG. 4 is a view illustrating an example of a pixel array of a display apparatus according to the aspect of the present disclosure.

Referring to FIG. 4, a plurality of horizontal pixel lines L1, L2, L3 and L4 may be provided in a pixel array of a display panel (e. g., the display panel DP of FIG. 2). A plurality of pixels PXL horizontally adjacent to each other and commonly connected to the gate lines (e. g., a scan line 410, a first emission signal line 420 and a second emission signal line 425) may be disposed in each of the plurality of horizontal pixel lines L1, L2, L3 and L4.

In this case, each of the horizontal pixel lines L1, L2, L3 and L4 may mean a plurality of pixels PXL disposed on one line implemented by the pixels PXL horizontally adjacent to each other. The pixel array may include a first power line 430 for supplying a high potential power voltage ELVDD to the pixel PXL and a second power line 440 for supplying a reference voltage Vref to the pixel PXL. In addition, the pixels PXL may be connected to a low potential power voltage ELVSS (shown in FIG. 5).

In the aspect, the gate line may include a scan line 410 to which a scan signal Scan is supplied, a common emission signal line 415 to which a common emission signal EM0 is supplied, a first emission signal line 420 to which a first emission signal EM1 is supplied, and a second emission signal line 425 to which a second emission signal EM2 is supplied.

The pixel PXL may emit light of at least one color. For example, the pixel PXL may emit any one of red light, green light, blue light and white light. The pixel PXL may constitute one unit pixel, and the color implemented in the unit pixel may be determined in accordance with a light emission ratio of red, green, blue and white. A data line 450, the scan line 410, the common emission signal line 415, the first emission signal line 420, the second emission signal line 425, the first power line 430 and the second power line 440 may be connected to each pixel PXL.

Figure 5:
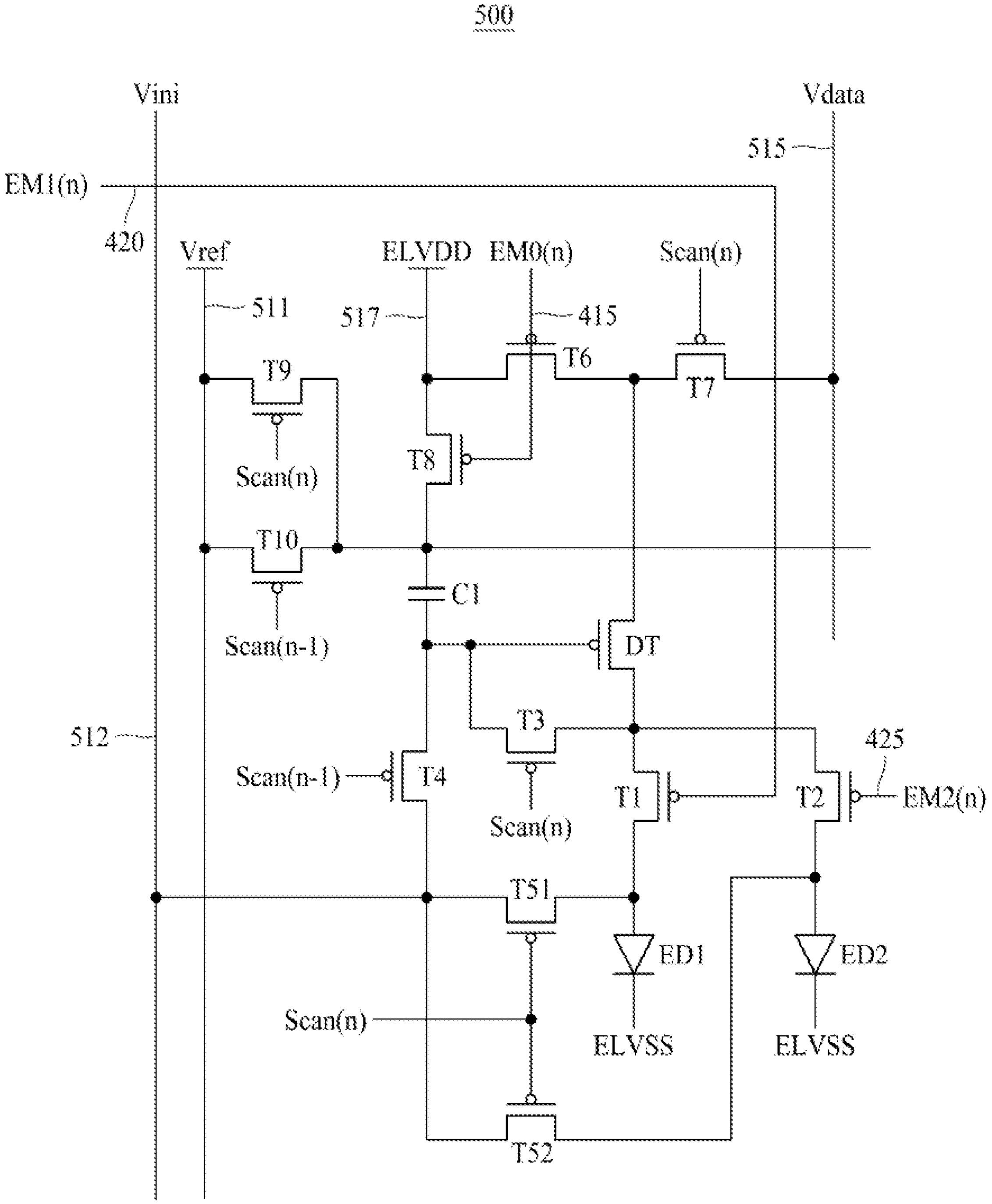
FIGS. 5 and 6 are views illustrating an example of a pixel circuit of a display apparatus according to the aspect of the present disclosure.
Figure 6:
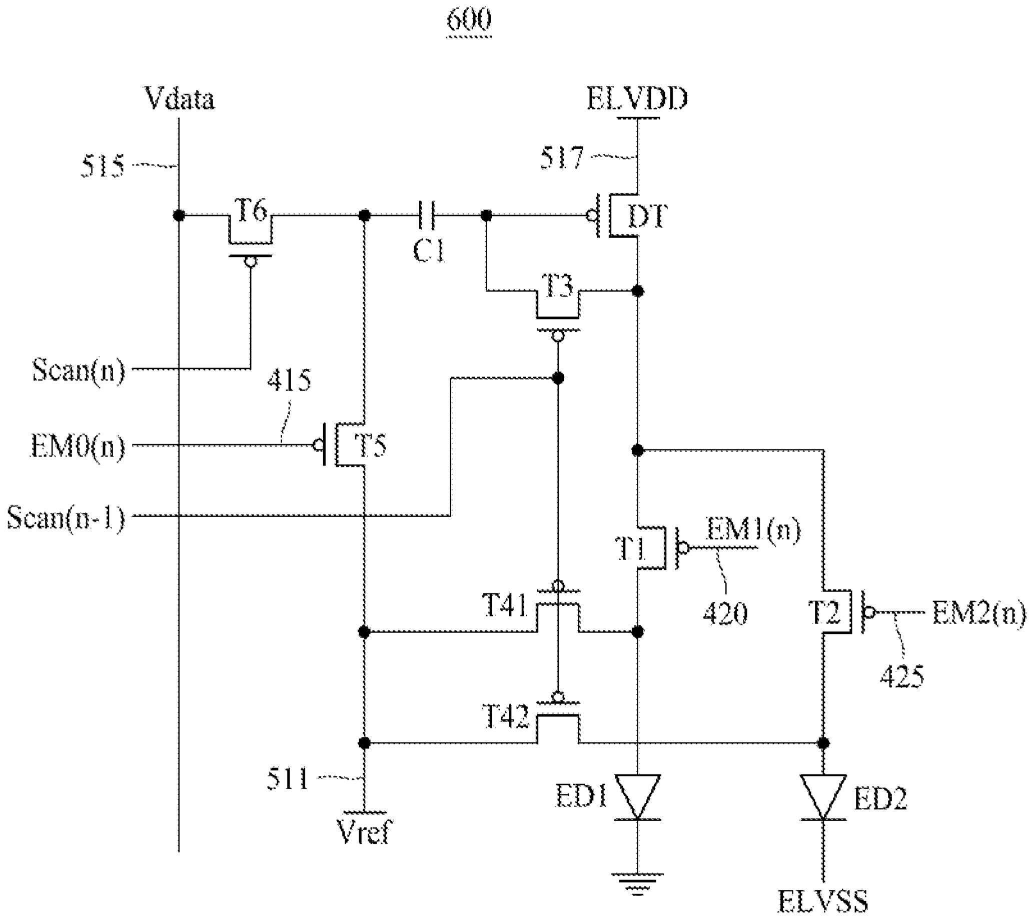

FIGS. 5 and 6 are views illustrating an example of a pixel circuit of a display apparatus according to the aspect of the present disclosure. In detail, FIGS. 5 and 6 illustrate an example of a pixel circuit of a unit pixel PXL included in a pixel array.

Referring to FIG. 5, a pixel circuit 500 may include twelve (12) transistors and one capacitor. At least a portion of the twelve transistors included in the pixel circuit 500 may be an n-type transistor or a p-type transistor. In case of the p-type transistor, a low level voltage of each driving signal means a voltage for turning on TFTs, and a high level voltage of each driving signal may mean a voltage for turning off the TFTs.

The low level voltage may correspond to a predesignated voltage lower than the high level voltage. For example, the low level voltage may include a voltage corresponding to a range of −8V to −12V. The high level voltage may correspond to a predesignated voltage higher than the low level voltage. For example, the high level voltage may include a voltage corresponding to a range of 6V to 8V. According to one aspect, the low level voltage may be referred to as a first voltage, and the high level voltage may be referred to as a second voltage. In this case, the first voltage may be a value lower than the second voltage.

A first electrode or a second electrode of a transistor, which will be described below, may refer to a source electrode or a drain electrode. However, the terms such as the first electrode and the second electrode are used to distinguish each electrode, and do not limit what corresponds to the respective electrodes. In addition, the first electrode may not refer to the same electrode for each electrode. For example, a first electrode of the first transistor T1 may refer to a source electrode of the first transistor T1, and a first electrode of a sixth transistor T6 may refer to a drain electrode of the sixth transistor T6.

The driving transistor DT may be connected to a first transistor T1 connected to a first light emitting element ED1 and a second transistor T2 connected to a second light emitting element ED2. For example, the first electrode of the driving transistor DT may be connected to the first transistor T1 and the second transistor T2. The first transistor T1 may be turned on or off by the first emission signal EM1 based on that a gate electrode of the first transistor T1 is connected to the first emission signal line 420. The second transistor T2 may be turned on or off by the second emission signal EM2 based on that a gate electrode of the second transistor T2 is connected to the second emission signal line 425. The first emission signal line 420 may correspond to a gate line providing the first emission signal EM1. The second emission signal line 425 may correspond to a gate line providing the second emission signal EM2.

The first emission signal EM1 of FIG. 5 may correspond to an (n)th first emission signal EM1 (n) supplied to an (n) th row in response to a case that the pixel circuit 500 is disposed in an (n) th pixel row. The second emission signal EM2 may correspond to an (n) th second emission signal EM2 (n) supplied to an (n) th row in response to a case that the pixel circuit 500 is disposed in the (n) th pixel row.

The driving transistor DT may be connected to at least one of the first transistor T1, the second transistor T2, a third transistor T3, a fourth transistor T4, a sixth transistor T6, a seventh transistor T7 and a capacitor C1. For example, a first electrode of the driving transistor DT may be connected to the first transistor T1, the second transistor T2, the third transistor T3 and the capacitor C1. A second electrode of the driving transistor DT may be connected to the sixth transistor T6 and the seventh transistor T7.

The first transistor T1 may be connected to at least one of the first light emitting element ED1, the second transistor T2, the third transistor T3, a (5-1) th transistor T51 and the driving transistor DT. For example, the first electrode of the first transistor T1 may be connected to the driving transistor DT and the third transistor T3. A second electrode of the first transistor T1 may be connected to the (5-1) th transistor T51 and the first light emitting element ED1. The gate electrode of the first transistor T1 may be connected to the first emission signal line 420 providing the first emission signal EM1. Therefore, the first transistor T1 may be turned on or off based on the provision of the first emission signal EM1. When the first transistor T1 is turned on, a voltage across the driving transistor DT may be applied to the first light emitting element ED1 (e. g., an anode electrode of the first light emitting element ED1).

The second transistor T2 may be connected to at least one of the second light emitting element ED2, the first transistor T1, the third transistor T3, a (5-2) th transistor T52 and the driving transistor DT. A first electrode of the second transistor T2 may be connected to the driving transistor DT and the third transistor T3. A second electrode of the second transistor T2 may be connected to the second light emitting element ED2 and the (5-2) th transistor T52. The gate electrode of the second transistor T2 may be connected to the second emission signal line 425 providing the second emission signal EM2. Therefore, the second transistor T2 may be turned on or off based on the provision of the second emission signal EM2. When the second transistor T2 is turned on, a voltage across the driving transistor DT may be applied to the second light emitting element ED2 (e. g., the anode electrode of the second light emitting element ED2).

A first lens may be disposed on the first light emitting element ED1. In this case, a viewing angle of an area in which the first light emitting element ED1 is disposed may have a first value or more. A second lens may be disposed on the second light emitting element ED2. In this case, a viewing angle of an area in which the second light emitting element ED2 is disposed may have a value less than the first value. The viewing angle of the area in which the first light emitting element ED1 is disposed may be wider than that of the area in which the second light emitting element ED2 is disposed. For example, the area in which the first light emitting element ED1 is disposed may provide light to a range corresponding to a driver's seat and a passenger seat. The area in which the second light emitting element ED2 is disposed may provide light to only a range corresponding to a passenger seat except for a driver's seat.

The third transistor T3 may be connected to at least one of the driving transistor DT, the first transistor T1, the second transistor T2, the fourth transistor T4 and the capacitor C1. For example, a first electrode of the third transistor T3 may be connected to the fourth transistor T4, the capacitor C1 and the driving transistor DT. A second electrode of the third transistor T3 may be connected to the first transistor T1, the second transistor T2 and the driving transistor DT. A gate electrode of the third transistor T3 may be connected to an (n) th scan line for supplying a scan signal Scan in a row in which the pixel circuit of FIG. 5 is disposed, that is, an (n) th row. Therefore, the third transistor T3 may be supplied with an (n) th scan signal Scan (n), and may be turned on or off by the (n) th scan signal Scan (n).

The fourth transistor T4 may be connected to at least one of the driving transistor DT, the third transistor T3, the (5-1) th transistor T51, a (5-2) th transistor T52 and the capacitor C1. For example, the first electrode of the fourth transistor T4 may be connected to the third transistor T3, the capacitor C1 and the driving transistor DT. A second electrode of the fourth transistor T4 may be connected to the (5-1) th transistor T51, the (5-2) th transistor T52 and an initialization voltage line 512 supplying an initialization voltage Vini. A gate electrode of the fourth transistor T4 may be connected to an (n−1) th scan line supplying a scan signal Scan in an (n−1) th row. The fourth transistor T4 may be supplied with an (n−1) th scan signal Scan (n−1), and may be turned on or off by the (n−1) th scan signal Scan (n−1).

The (5-1) th transistor T51 may be connected to at least one of the first transistor T1, the fourth transistor T4 and the first light emitting element ED1. For example, a first electrode of the (5-1) th transistor T51 may be connected to the fourth transistor T4. A second electrode of the (5-1) th transistor T51 may be connected to the first transistor T1 and the first light emitting element ED1. A gate electrode of the (5-1) th transistor T51 may be connected to the (n) th scan line. Therefore, the (5-1) th transistor T51 may be supplied with the (n) th scan signal Scan (n), and may be turned on or off by the (n) th scan signal Scan (n).

The (5-2) th transistor T52 may be connected to at least one of the second transistor T2, the fourth transistor T4 and the second light emitting element ED2. For example, a first electrode of the (5-2) th transistor T52 may be connected to the fourth transistor T4. A second electrode of the (5-2) th transistor T52 may be connected to the second transistor T2 and the second light emitting element ED2. A gate electrode of the (5-2) th transistor T52 may be connected to the (n) th scan line. Therefore, the (5-2) th transistor T52 may be supplied with the (n) th scan signal Scan (n), and may be turned on or off by the (n) th scan signal Scan (n).

The sixth transistor T6 may be connected to at least one of the seventh transistor T7, an eighth transistor T8 and the driving transistor DT. For example, a first electrode of the sixth transistor T6 may be connected to the seventh transistor T7 and the driving transistor DT. A second electrode of the sixth transistor T6 may be connected to the eighth transistor T8. In addition, a second electrode of the sixth transistor T6 may be connected to a high potential voltage line 517 for supplying a high potential voltage ELVDD. A gate electrode of the sixth transistor T6 may be connected to the common emission signal line 415. In this case, the sixth transistor T6 may be supplied with the common emission signal EM0, and may be turned on or off by the common emission signal EM0. The common emission signal EM0 of FIG. 5 may correspond to an (n) th common emission signal EM0 (n) supplied to the (n) th row in response to the case that the pixel circuit 500 is disposed in the (n) th pixel row.

In the aspect when the sixth transistor T6 is turned on based on the supply of the (n) th common emission signal EM0 (n), the high potential voltage ELVDD may be applied to the second electrode of the driving transistor DT.

The seventh transistor T7 may be connected to at least one of the sixth transistor T6 and the driving transistor DT. For example, the first electrode of the seventh transistor T7 may be connected to the sixth transistor T6 and the driving transistor DT. A second electrode of the seventh transistor T7 may be connected to the data line 515 (e. g., the data line DL of FIG. 3) that supplies a data voltage Vdata. A gate electrode of the seventh transistor T7 may be connected to the (n) th scan line. Therefore, the seventh transistor T7 may be supplied with the (n) th scan signal Scan (n), and may be turned on or off by the (n) th scan signal Scan (n).

In the aspect, when the seventh transistor T7 is turned on based on the supply of the (n) th scan signal Scan (n), the data voltage Vdata may be applied to the second electrode of the driving transistor DT.

In the aspect, the eighth transistor T8 may be connected to at least one of the capacitor C1, the sixth transistor T6, a ninth transistor T9 and a tenth transistor T10. For example, a first electrode of the eighth transistor T8 may be connected to the sixth transistor T6 and a high potential voltage line 517 supplying a high potential voltage ELVDD. A second electrode of the eighth transistor T8 may be connected to the capacitor C1, the ninth transistor T9 and the tenth transistor T10. A gate electrode of the eighth transistor T8 may be connected to the common emission signal line 415. In this case, the eighth transistor T8 may be supplied with the common emission signal EM0, and may be turned on or off by the common emission signal EM0.

In one aspect, the ninth transistor T9 may be connected to at least one of the eighth transistor T8, the tenth transistor T10 and the capacitor C1. For example, a first electrode of the ninth transistor T9 may be connected to the tenth transistor T10. A first electrode of the ninth transistor T9 may be further connected to a reference voltage line 511 providing a reference voltage Vref. A second electrode of the ninth transistor T9 may be connected to the capacitor C1, the eighth transistor T8 and the tenth transistor T10. A gate electrode of the ninth transistor T9 may be connected to the (n) th scan line. Therefore, the ninth transistor T9 may be supplied with the (n) th scan signal Scan (n), and may be turned on or off by the (n) th scan signal Scan (n).

In the aspect, the tenth transistor T10 may be connected to at least one of the eighth transistor T8, the ninth transistor T9 and the capacitor C1. For example, a first electrode of the tenth transistor T10 may be connected to the ninth transistor T9. A first electrode of the tenth transistor T10 may be further connected to the reference voltage line 511 providing the reference voltage Vref. A second electrode of the tenth transistor T10 may be connected to the capacitor C1, the eighth transistor T8 and the ninth transistor T9. The tenth transistor T10 may be connected to the ninth transistor T9 in parallel. A gate electrode of the tenth transistor T10 may be connected to the (n−1) th scan line. Therefore, the tenth transistor T10 may be supplied with the (n−1) th scan signal Scan (n−1), and the tenth transistor T10 may be turned on or off by the (n−1) th scan signal Scan (n−1).

FIG. 6 shows a pixel circuit 600 according to one aspect different from that of FIG. 5. Hereinafter, a redundant description of the description made with reference to FIG. 5 may be omitted. The pixel circuit 600 of FIG. 6 may include eight transistors and one capacitor. At least a portion of the eight transistors included in the pixel circuit 600 may be an n-type transistor or a p-type transistor.

The driving transistor DT may be connected to at least one of the first transistor T1, the second transistor T2, the third transistor T3 and the capacitor C1. The driving transistor DT may be further connected to the high potential voltage line 517. For example, a first electrode of the driving transistor DT may be connected to the high potential voltage line 517. A second electrode of the driving transistor DT may be connected to the first transistor T1, the second transistor T2 and the third transistor T3. A gate electrode of the driving transistor DT may be connected to the capacitor C1.

The first transistor T1 may be connected to at least one of the second transistor T2, the third transistor T3, a (4-1)th transistor T41, the first light emitting element ED1 and the driving transistor DT. For example, the first electrode of the first transistor T1 may be connected to the second transistor T2, the third transistor T3 and the driving transistor DT. The second electrode of the first transistor T1 may be connected to the (4-1) th transistor T41 and the first light emitting element ED1. The gate electrode of the first transistor T1 may be connected to the first emission signal line 420, and the first transistor T1 may be turned on or off by the first emission signal EM1 based on the connection with the first emission signal line 420.

The second transistor T2 may be connected to at least one of the first transistor T1, the third transistor T3, a (4-2) th transistor T42, the second light emitting element ED2 and the driving transistor DT. For example, the first electrode of the second transistor T2 may be connected to the first transistor T1, the third transistor T3 and the driving transistor DT. The second electrode of the second transistor T2 may be connected to the (4-2) th transistor T42 and the second light emitting element ED2. The gate electrode of the second transistor T2 may be connected to the second emission signal line 425, and the second transistor T2 may be turned on or off by the second emission signal EM2 based on the connection with the second emission signal line 425.

The third transistor T3 may be connected to at least one of the capacitor C1, the driving transistor DT, the first transistor T1, the second transistor T2, the (4-1) th transistor T41 and the (4-2) th transistor T42. For example, the first electrode of the third transistor T3 may be connected to the capacitor C1 and the driving transistor DT. The second electrode of the third transistor T3 may be connected to the driving transistor DT, the first transistor T1 and the second transistor T2. The gate electrode of the third transistor T3 may be connected to the (n−1) th scan line supplying the scan signal in the (n−1) th row. Therefore, the third transistor T3 may be supplied with the (n−1) th scan signal Scan (n−1), and the third transistor T3 may be turned on or off by the (n−1) th scan signal Scan (n−1).

The (4-1) th transistor T41 may be connected to at least one of the first transistor T1, the fifth transistor T5 and the first light emitting element ED1. For example, a first electrode of the (4-1) th transistor T41 may be connected to the fifth transistor T5. A second electrode of the (4-1) th transistor T41 may be connected to the first transistor T1 and the first light emitting element ED1. A gate electrode of the (4-1) th transistor T41 may be connected to the (n−1) th scan line. Therefore, the (4-1) th transistor T41 may be supplied with the (n−1) th scan signal Scan (n−1), and may be turned on or off by the (n−1) th scan signal Scan (n−1).

The (4-2) th transistor T42 may be connected to at least one of the second transistor T2, the fifth transistor T5 and the second light emitting element ED2. For example, a first electrode of the (4-2) th transistor T42 may be connected to a fifth transistor T5. A second electrode of the (4-2) th transistor T42 may be connected to the second transistor T2 and the second light emitting element ED2. A gate electrode of the (4-2) th transistor T42 may be connected to an (n−1) th scan line. Therefore, the fourth-second transistor T42 may be supplied with the (n−1) th scan signal Scan (n−1) and may be turned on or off by the (n−1) th scan signal Scan (n−1).

The fifth transistor T5 may be connected to at least one of the (4-1) th transistor T41, the (4-2) th transistor T42, the sixth transistor T6 and the capacitor C1. For example, a first electrode of the fifth transistor T5 may be connected to the sixth transistor T6 and the capacitor C1. A second electrode of the fifth transistor T5 may be connected to the (4-1) th transistor T41 and the (4-2) th transistor T42. The second electrode of the fifth transistor T5 may be further connected to the reference voltage line 511 providing the reference voltage Vref. A gate electrode of the fifth transistor T5 may be connected to the common emission signal line 415 for supplying the common emission signal EM0. Therefore, the fifth transistor T5 may be supplied with the common emission signal EM0, and may be turned on or off by the common emission signal EM0.

The sixth transistor T6 may be connected to at least one of the fifth transistor T5 and the capacitor C1. For example, a first electrode of the sixth transistor T6 may be connected to the fifth transistor T5 and the capacitor C1. A second electrode of the sixth transistor T6 may be connected to a data line 515 (e. g., the data line DL of FIG. 3) that supplies the data voltage Vdata. A gate electrode of the sixth transistor T6 may be connected to the (n) th scan line supplying the scan signal Scan in the (n) th row. Therefore, the sixth transistor T6 may be supplied with the (n) th scan signal Scan (n), and the sixth transistor T6 may be turned on or off by the (n) th scan signal Scan (n).

FIG. 5 and FIG. 6 illustrate an example in which transistors are implemented as p-type, but the present disclosure is not limited thereto. At least some of the transistors included in FIGS. 5 and/or 6 may be implemented as n-type in accordance with an aspect.

Figure 7:
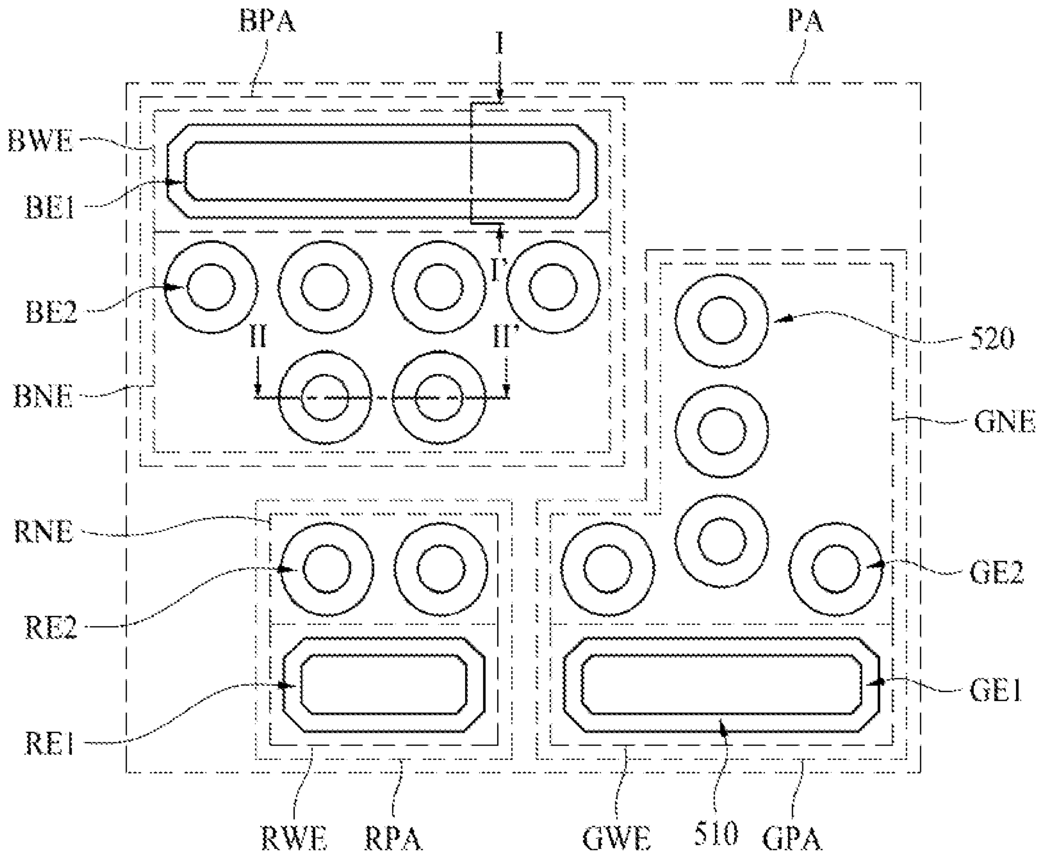
FIG. 7 is a view illustrating an example of a lens arrangement included in a display apparatus according to the aspect of the present disclosure.
Figure 8:
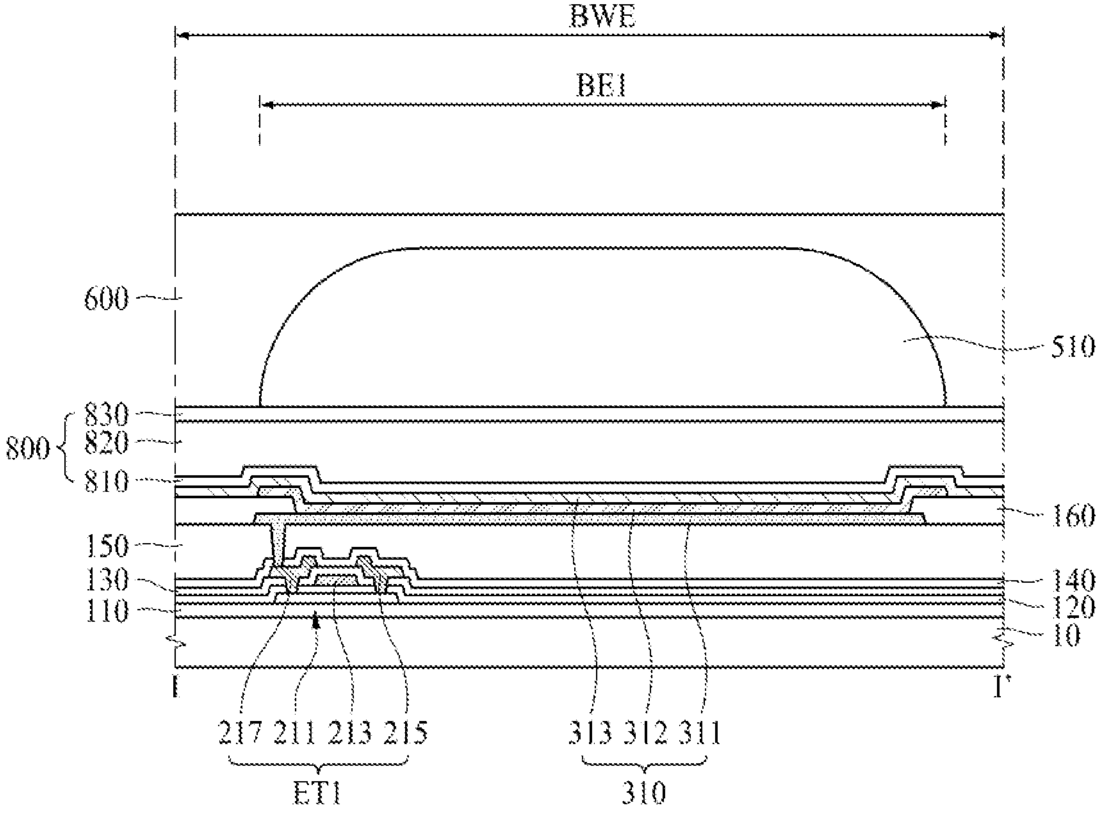
FIG. 8 is a cross-sectional view taken along line I-I' of FIG. 7.
Figure 9:
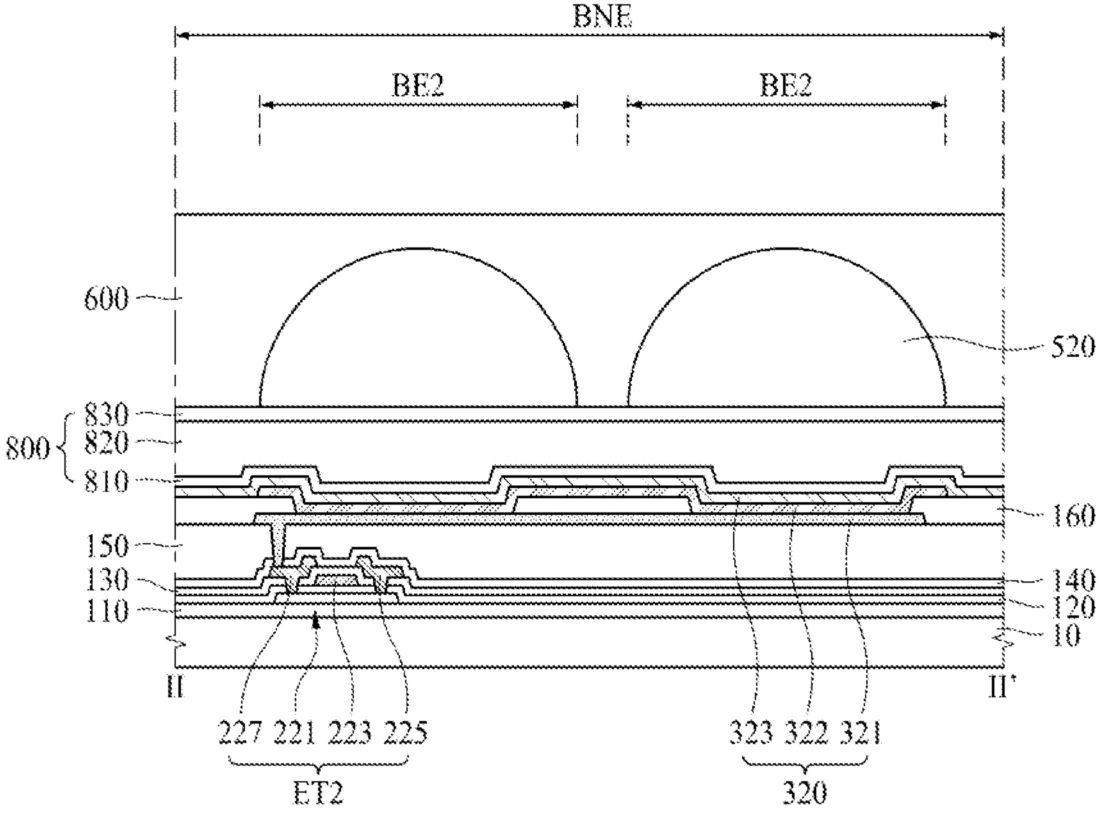
FIG. 9 is a cross-sectional view taken along line II-IF of FIG. 7.

FIG. 7 illustrates a plane of a portion of a display apparatus according to one aspect of the present disclosure. FIG. 7 illustrates a plane of a pixel area PA when three subpixels are disposed in a pixel area PA. FIG. 8 is a cross-sectional view taken along line I-I' of FIG. 7, and FIG. 9 is a cross-sectional view taken along line II-IF of FIG. 7. The following description will be given with reference to FIGS. 7 to 9.

In FIG. 7, the pixel area PA may include a blue subpixel area BPA for implementing a blue color, a red subpixel area RPA for implementing a red color, and a green subpixel area GPA for implementing a green color. In accordance with the aspect, the blue subpixel area BPA may correspond to a first subpixel, the red subpixel area RPA may correspond to a second subpixel, and the green subpixel area GPA may correspond to a third subpixel. The pixel circuit may correspond to each of the subpixels. A corresponding pixel circuit may be disposed for each of the subpixels.

The pixel area PA may include first lens areas BWE, RWE and GWE and second lens areas BNE, RNE and GNE, which provide different viewing angles. The second lens areas BNE, RNE and GNE of each pixel area PA may operate individually from the first lens areas BWE, RWE and GWE of the corresponding pixel area PA. For example, each pixel area PA may include a first light emitting element 310 (e. g., the first light emitting element 310 of FIG. 3) positioned on the first lens areas (e. g., BWE, RWE and GWE) of the corresponding pixel area PA and a second light emitting element 320 (e. g., the second light emitting element 320 of FIG. 3) positioned on the second lens areas BNE, RNE and GNE of the corresponding pixel area PA.

The first light emitting element 310 may emit light representing a specific color. For example, the first light emitting element 310 may include a first lower electrode 311, a first light emitting layer 312 and a first upper electrode 313, which are sequentially stacked on a substrate 10. The substrate 10 may include an insulating material. The substrate 10 may include a transparent material. For example, the substrate 10 may include glass or plastic.

The first lower electrode 311 may include a conductive material. The first lower electrode 311 may include a material having high reflectance. For example, the first lower electrode 311 may include a metal such as aluminum (Al) and silver (Ag). The first lower electrode 311 may have a multi-layered structure. For example, the first lower electrode 311 may have a structure in which a reflective electrode made of metal is positioned between transparent electrodes made of a transparent conductive material such as ITO and IZO.

The first light emitting layer 312 may generate light of luminance corresponding to a voltage difference between the first lower electrode 311 and the first upper electrode 313. For example, the first light emitting layer 312 may include an emission material layer EML that includes a light emitting material. The light emitting material may include an organic material, an inorganic material or a hybrid material.

The first light emitting layer 312 may have a multi-layered structure. For example, the first light emitting layer 312 may further include at least one of a hole injection layer HIL, a hole transport layer HTL, an electron transport layer ETL and an electron injection layer EIL.

The first upper electrode 313 may include a conductive material. The first upper electrode 313 may include a material different from that of the first lower electrode 311. Transmittance of the first upper electrode 313 may be higher than that of the first lower electrode 311. For example, the first upper electrode 313 may be a transparent electrode made of a transparent conductive material such as indium tin oxide (ITO) and indium zinc oxide (IZO). Therefore, in the display apparatus according to one aspect of the present disclosure, light generated by the first light emitting layer 312 may be emitted through the first upper electrode 313.

The second light emitting element 320 may implement the same color as that of the first light emitting element 310. The second light emitting element 320 may have the same structure as that of the first light emitting element 310. For example, the second light emitting element 320 may include a second lower electrode 321, a second light emitting layer 322 and a second upper electrode 323, which are sequentially stacked on the substrate 10.

The second lower electrode 321 may correspond to the first lower electrode 311, the second light emitting layer 322 may correspond to the first light emitting layer 312, and the second upper electrode 323 may correspond to the first upper electrode 313. For example, the second lower electrode 321 may be formed with respect to the second light emitting element 320 in the same structure as that of the first lower electrode 311, and this may be equally applied to the second light emitting layer 322 and the second upper electrode 323. That is, the first light emitting element 310 and the second light emitting element 320 may be formed to have the same structure, but the present disclosure is not limited thereto. At least some elements of the first light emitting element 310 and the second light emitting element 320 may be configured differently from each other as the case may be.

In the aspect, the second light emitting layer 322 may be spaced apart from the first light emitting layer 312. Therefore, in the display apparatus according to the aspect of the present disclosure, light emission due to a leakage current may be avoided. Also, in the display apparatus according to one aspect of the present disclosure, light may be generated in only one of the first light emitting layer 312 and the second light emitting layer 322 in accordance with a user selection or a predesignated condition.

In the aspect, the first light emitting element 310 and the second light emitting element 320 of the pixel area PA may be positioned on a driving portion (e. g., the driving portion 205 of FIG. 3) of the corresponding pixel area PA. For example, at least one insulating film (e. g., an element buffer film 110, a gate insulating film 120, an interlayer insulating film 130, a lower passivation film 140 and an overcoat layer 150) is positioned on the substrate 10, and the first light emitting element 310 and the second light emitting element 320 of each pixel area PA may be disposed on one of the insulating films. Therefore, in the display apparatus according to one aspect of the present disclosure, the first light emitting element 310 and the second light emitting element 320 of each pixel area PA may be prevented from being unnecessarily connected to the driving portion 205 of the corresponding pixel area PA.

In the aspect, the element buffer film 110, the gate insulating film 120, the interlayer insulating film 130, the lower passivation film 140 and the overcoat layer 150 may be stacked on the substrate 10. The element buffer film 110 may include an insulating material. For example, the element buffer film 110 may include an inorganic insulating material such as silicon oxide (SiO) and silicon nitride (SiN). The element buffer film 110 may have a multi-layered structure. For example, the element buffer film 110 may have a stacked structure of a film made of silicon nitride (SiN) and a film made of silicon oxide (SiO).

In the aspect, the element buffer film 110 may be positioned between the substrate 10 and the driving portion 205 of each pixel area PA. The element buffer film 110 may prevent the substrate 10 from being contaminated in a process of forming the driving portion 205. For example, an upper surface of the substrate 10 directed toward the driving portion 205 of each pixel area PA may be covered by the element buffer film 110. The driving portion 205 of each pixel area PA may be positioned on the element buffer film 110.

In the aspect, the gate insulating film 120 may include an insulating material. For example, the gate insulating film 120 may include an inorganic insulating material such as silicon oxide (SiO) or silicon nitride (SiN). The gate insulating film 120 may include a material having a high dielectric constant. For example, the gate insulating film 120 may include a High-K material such as hafnium oxide (HfO). The gate insulating film 120 may have a multi-layered structure.

The gate insulating film 120 may be positioned on the element buffer film 110. The gate insulating film 120 may be extended between a semiconductor pattern and a gate electrode of a transistor. For example, gate electrodes of the driving transistor DT and the switching transistor ST may be insulated from semiconductor patterns of the driving transistor DT and the switching transistor ST by the gate insulating film 120. The gate insulating film 120 may cover a first semiconductor pattern and a second semiconductor pattern of each pixel area PA. The gate electrodes of the driving transistor DT and the switching transistor ST may be disposed on the gate insulating film 120.

The interlayer insulating film 130 may include an insulating material. For example, the interlayer insulating film 130 may include an inorganic insulating material such as silicon oxide (SiO) or silicon nitride (SiN). The interlayer insulating film 130 may be positioned on the gate insulating film 120. The interlayer insulating film 130 may be extended between the gate electrode and the source electrode and between the gate electrode and the drain electrode of each of the driving transistor DT and the switching transistor ST. For example, the source electrode and the drain electrode of each of the driving transistor DT and the switching transistor ST may be insulated from the gate electrode by the interlayer insulating film 130. The interlayer insulating film 130 may cover the gate electrode of each of the driving transistor DT and the switching transistor ST. The source electrode and the drain electrode of each pixel area PA may be disposed on the interlayer insulating film 130. The gate insulating film 120 and the interlayer insulating film 130 may expose a source area and a drain area of each semiconductor pattern positioned in each pixel area PA.

In the aspect, the lower passivation film 140 may include an insulating material. For example, the lower passivation film 140 may include an inorganic insulating material such as silicon oxide (SiO) and silicon nitride (SiN). The lower passivation film 140 may be positioned on the interlayer insulating film 130. The lower passivation film 140 may prevent the driving portion 205 from being damaged due to external moisture and impact. The lower passivation film 140 may be extended along a surface of the driving transistor DT and the switching transistor ST, which are opposite to the substrate 10. The lower passivation film 140 may be in contact with the interlayer insulating film 130 outside the driving portion 205 positioned in each pixel area PA.

The overcoat layer 150 may include an insulating material. The overcoat layer 150 may include a material different from that of the lower passivation film 140. For example, the overcoat layer 150 may include an organic insulating material. The overcoat layer 150 may be positioned on the lower passivation film 140. The overcoat layer 150 may remove a step difference caused by the driving portion 205 of each pixel area PA. For example, an upper surface of the overcoat layer 150 facing the substrate 10 may be a flat surface.

In the aspect, the first transistor ET1 may be electrically connected between the drain electrode of the driving transistor DT and the first lower electrode 311 of the first light emitting element 310. The second transistor ET2 may be electrically connected between the drain electrode of the driving transistor DT and the second lower electrode 321 of the second light emitting element 320.

The first transistor ET1 may include a first light emitting semiconductor pattern 211, a first light emitting gate electrode 213, a first light emitting source electrode 215 and a first light emitting drain electrode 217. The first transistor ET1 may have the same structure as that of the switching transistor ST and the driving transistor DT. For example, the first light emitting semiconductor pattern 211 is positioned between the element buffer film 110 and the gate insulating film 120, and the first light emitting gate electrode 213 may be positioned between the gate insulating film 120 and the interlayer insulating film 130. The first light emitting source electrode 215 and the first light emitting drain electrode 217 may be positioned between the interlayer insulating film 130 and the lower passivation film 140. The first light emitting gate electrode 213 may overlap with a channel area of the first light emitting semiconductor pattern 211. The first light emitting source electrode 215 may be electrically connected to a source area of the first light emitting semiconductor pattern 211. The first light emitting drain electrode 217 may be electrically connected to a drain area of the first light emitting semiconductor pattern 211.

In the aspect, the second transistor ET2 may include a second light emitting semiconductor pattern 221, a second light emitting gate electrode 223, a second light emitting source electrode 225 and a second light emitting drain electrode 227. For example, the second light emitting semiconductor pattern 221 may be positioned on the same layer as the first light emitting semiconductor pattern 211, the second light emitting gate electrode 223 may be positioned on the same layer as the first light emitting gate electrode 213, and the second light emitting source electrode 225 and the second light emitting drain electrode 227 may be positioned on the same layer as the first light emitting source electrode 215 and the first light emitting drain electrode 217.

In the aspect, the first transistor ET1 may be formed simultaneously with the switching transistor ST and the driving transistor DT. The first transistor ET1 may be formed simultaneously with the second transistor ET2.

The first light emitting element 310 and the second light emitting element 320 of each pixel area PA may be positioned on the overcoat layer 150 of the corresponding pixel area PA. For example, the first lower electrode 311 of the first light emitting element 310 may be electrically connected to the first light emitting drain electrode 217 of the first transistor ET1 by passing through the lower passivation film 140 and the overcoat layer 150, and the second lower electrode 321 of the second light emitting element 320 may be electrically connected to the second light emitting drain electrode 227 of the second transistor ET2 by passing through the lower passivation film 140 and the overcoat layer 150.

The second lower electrode 321 of each pixel area PA may be spaced apart from the first lower electrode 311 of the corresponding pixel area PA. For example, a bank insulating film 160 may be disposed between the first lower electrode 311 and the second lower electrode 321 of each pixel area PA. The bank insulating film 160 may include an insulating material. For example, the bank insulating film 160 may include an organic insulating material. The bank insulating film 160 may include a material different from that of the overcoat layer 150.

The second lower electrode 321 of each pixel area PA may be insulated from the first lower electrode 311 of the corresponding pixel area PA by the bank insulating film 160. For example, the bank insulating film 160 may cover an edge of the first lower electrode 311 and an edge of the second lower electrode 321, which are positioned in each pixel area PA. Therefore, in the display apparatus, an image by the first lens areas BWE, RWE and GWE of each pixel area PA in which the first light emitting element 310 is positioned or an image by the second lens areas BNE, RNE and GNE of each pixel area PA in which the second light emitting element 320 is positioned may be provided to a user.

The first light emitting layer 312 and the first upper electrode 313 of the first light emitting element 310 positioned in each pixel area PA may be stacked on a partial area of the corresponding first lower electrode 311 exposed by the bank insulating film 160. The second light emitting layer 322 and the second upper electrode 323 of the second light emitting element 320 positioned in each pixel area PA may be stacked on a partial area of the corresponding second lower electrode 321 exposed by the bank insulating film 160. For example, the bank insulating film 160 may distinguish first light emission areas BE1, RE1 and GE1 from which light by the first light emitting element 310 is emitted in each pixel area PA from second light emission areas BE2, RE2 and GE2 from which light by the second light emitting element 320 is emitted. A size of the second light emission areas BE2, RE2 and GE2 distinguished in each pixel area PA may be smaller than that of the first light emission areas BE1, RE1 and GE1.

The second upper electrode 323 of each pixel area PA may be electrically connected to the first upper electrode 313 of the corresponding pixel area PA. For example, a voltage applied to the second upper electrode 323 of the second light emitting element 320 positioned in each pixel area PA may be the same as that applied to the first upper electrode 313 of the first light emitting element 310 positioned in the corresponding pixel area PA. The second upper electrode 323 of each pixel area PA may include the same material as that of the first upper electrode 313 of the corresponding pixel area PA. For example, the second upper electrode 323 of each pixel area PA may be formed simultaneously with the first upper electrode 313 of the corresponding pixel area PA. The second upper electrode 323 of each pixel area PA may be extended onto the bank insulating film 160 to directly contact the first upper electrode 313 of the corresponding pixel area PA. Luminance of the first lens areas BWE, RWE and GWE positioned in each pixel area PA and luminance of the second lens areas BNE, RNE and GNE may be controlled by a driving current generated in the corresponding pixel area PA.

An encapsulation member 800 may be positioned on the first light emitting element 310 and the second light emitting element 320 of each pixel area PA. The encapsulation member 800 may prevent the light emitting elements 310 and 320 from being damaged due to external moisture and impact. The encapsulation member 800 may have a multi-layered structure. For example, the encapsulation member 800 may include a first encapsulation layer 810, a second encapsulation layer 820 and a third encapsulation layer 830, which are sequentially stacked. The first encapsulation layer 810, the second encapsulation layer 820 and the third encapsulation layer 830 may include an insulating material. The second encapsulation layer 820 may include a material different from that of the first encapsulation layer 810 and the third encapsulation layer 830. For example, the first encapsulation layer 810 and the third encapsulation layer 830 may be inorganic encapsulation layers that include an inorganic insulating material, and the second encapsulation layer 820 may be an organic encapsulation layer that includes an organic insulating material. Therefore, the light emitting elements 310 and 320 of the display apparatus may be effectively prevented from being damaged due to external moisture and impact.

A first lens 510 and a second lens 520 may be positioned on the encapsulation member 800 of each pixel area PA.

The first lens 510 may be positioned on the first lens areas BWE, RWE and GWE of each pixel area PA. For example, light generated by the first light emitting element 310 of each pixel area PA may be emitted through the first lens 510 of the corresponding pixel area PA. The first lens 510 may have a shape in which light in at least one direction may not be limited. For example, a planar shape of the first lens 510 positioned in each pixel area PA may have a bar shape extended in a first direction.

In this case, a moving direction of light emitted from the first lens areas BWE, RWE and GWE of the pixel area PA may not be limited to the first direction. For example, content or image provided through the first lens areas BWE, RWE and GWE of the pixel area PA may be shared with people adjacent to the user in the first direction. The case that the content is provided through the first lens areas BWE, RWE and GWE is a mode in which the content is provided in a first viewing angle range wider than a second viewing angle range provided by the second lens areas BNE, RNE and GNE, and may be referred to as a first mode.

The second lens 520 may be positioned on the second lens areas BNE, RNE and GNE of each pixel area PA. The light generated by the second light emitting element 320 of the pixel area PA may be emitted through the second lens 520 of the corresponding pixel area PA. The second lens 520 may limit the moving direction of the light passing therethrough in the first direction and/or a second direction. For example, a planar shape of the second lens 520 positioned in the pixel area PA may have a circular shape. In this case, the moving direction of the light emitted from the second lens areas BNE, RNE and GNE of the pixel area PA may be limited to the first direction and the second direction. That is, the content provided by the second lens areas BNE, RNE and GNE of the pixel area PA may not be shared with people adjacent to the user. The case that the content is provided through the second lens areas BNE, RNE and GNE is a mode in which the content is provided in the second viewing angle range narrower than the first viewing angle range provided by the first lens areas BWE, RWE and GWE, and may be referred to as a second mode.

The first light emission areas BE1, RE1 and GE1 included in the first lens areas BWE, RWE and GWE of each pixel area PA may have a shape corresponding to the first lens 510 positioned on the first lens areas BWE, RWE and GWE of the corresponding pixel area PA. For example, planar shapes of the first light emission areas BE1, RE1 and GE1 defined in the first lens areas BWE, RWE and GWE of each pixel area PA may have bar shapes extended in the first direction. The first lens 510 positioned on the first lens areas BWE, RWE and GWE of the pixel area PA may have a size greater than that of the first light emission areas BE1, RE1 and GE1 included in the first lens areas BWE, RWE and GWE of the corresponding pixel area PA. Therefore, efficiency of the light emitted from the first light emission areas BE1, RE1 and GE1 of the pixel area PA may be improved.

The second light emission areas BE2, RE2 and GE2 included in the second lens areas BNE, RNE and GNE of each pixel area PA may have a shape corresponding to the second lens 520 positioned on the second lens areas BNE, RNE and GNE of the corresponding pixel area PA. For example, planar shapes of the second light emission areas BE2, RE2 and GE2 included in the second lens areas BNE, RNE and GNE of the pixel area PA may have a circular shape. The second lens 520 positioned on the second lens areas BNE, RNE and GNE of the pixel area PA may have a size greater than that of the second light emission areas BE2, RE2 and GE2 included in the second lens areas BNE, RNE and GNE of the corresponding pixel area PA. For example, the planar shapes of the second light emission area BE2, RE2 and GE2 positioned in the second lens areas BNE, RNE and GNE of each pixel area PA may be concentric circles with the planar shape of the second lens 520 positioned on the second lens areas BNE, RNE and GNE of the corresponding pixel area PA. In this case, efficiency of the light emitted from the second light emission areas BE2, RE2 and GE2 of the pixel area PA may be improved.

In the aspect, the first lens area BWE, RWE or GWE of the pixel area PA may include one first emission area BE1, RE1 or GE1. The second lens area BNE, RNE or GNE of the pixel area PA may include a plurality of second light emission areas BE2, RE2 or GE2.

In the aspect, one first lens 510 may be disposed on the first lens areas BWE, RWE and GWE of the pixel area PA. A plurality of second lenses 520 may be disposed on the second lens areas BNE, RNE and GNE of the pixel area PA.

In one aspect, the second light emission areas BE2, RE2 and GE2 included in the second lens areas BNE, RNE and GNE of the pixel area PA may be driven for each subpixel area. The second light emission areas (e. g., the second light emission areas BE2, the second light emission areas RE2 or the second light emission areas GE2) included in one subpixel area may be simultaneously driven.

In the aspect, one second lower electrode 321 may be positioned on the second lens areas BNE, RNE and GNE of each pixel area PA. The bank insulating film 160 may be positioned between the second lower electrode 321 and the second light emitting layer 322 between the second light emission areas BE2, RE2 and GE2. The bank insulating film 160 may be positioned between the second lower electrode 321 and the second light emitting layer 322 between the second light emission areas BE2, between the second light emission areas RE2 and/or between the second light emission areas GE2. The second light emitting layer 322 may be spaced apart from the second lower electrode 321 by the bank insulating film 160 between the second light emission areas BE2, RE2 and GE2 of the second lens areas BNE, RNE and GNE. In this case, light emission efficiency of the second light emission areas BE2, RE2 and GE2 may be improved.

In the aspect, a size of each of the second light emission areas BE2, RE2 and GE2 positioned in the second lens areas BNE, RNE and GNE of the pixel area PA may be designated as a specific value. For example, the sizes of the second light emission areas BE2, RE2 and GE2 positioned in the second lens areas BNE, RNE and GNE may be implemented to be the same as one another. The second light emission areas BE2, RE2 and GE2 positioned in the second lens areas BNE, RNE and GNE of the pixel area PA may have the same sizes as those of the second light emission areas BE2, RE2 and GE2 included in the second lens areas BNE, RNE and GNE of the pixel area PA adjacent thereto.

In the aspect, the number of second light emission areas may be different for each of the subpixel areas RPA, GPA and BPA. For example, the number of second light emission areas BE2 defined in the second lens area BNE of the blue subpixel area BPA may be greater than the number of second light emission areas RE2 defined in the second lens area RNE of the red subpixel area RPA. The number of second light emission areas RE2 defined in the second lens area RNE of the red subpixel area RPA may be greater than the number of second light emission areas GE2 defined in the second lens area GNE of the green subpixel area GPA. In this case, efficiency deviation of the second light emitting element 320 positioned on the second lens areas BNE, RNE and GNE of the pixel area may be supplemented by the number of second light emission areas BE2, RE2 and GE2 defined in the second lens areas BNE, RNE and GNE of each pixel area PA.

In the aspect, the sizes of the first light emission areas BE1, RE1 and GE1 may be different for each of the subpixel areas RPA, GPA and BPA. For example, the first light emission area BE1 of the blue subpixel area BPA may have a size different from that of the first light emission area RE1 of the red subpixel area RPA, and may have a size different from that of the first light emission area GE1 of the green subpixel area GPA. The size of the first light emission area BE1 of the blue subpixel area BPA may be greater than that of the first light emission area RE1 of the red subpixel area RPA. The size of the first light emission area RE1 of the red subpixel area RPA may be greater than that of the first light emission area GE1 of the green subpixel area GPA. Therefore, in the display apparatus according to one aspect of the present disclosure, efficiency deviation of the first light emitting element 310 positioned on the first lens areas BWE, RWE and GWE of each pixel area PA may be supplemented by the size of the first light emission areas BE1, RE1, GE1 defined in the first lens areas BWE, RWE and GWE of each pixel area PA.

In the aspect, a lens protection film 600 may be positioned on the first lens 510 and the second lens 520 of the pixel area PA. The lens protection film 600 may include an insulating material. For example, the lens protection film 600 may include an organic insulating material. A refractive index of the lens protection film 600 may be smaller than a refractive index of the first lens 510 and a refractive index of the second lens 520, which are positioned in each pixel area PA. Therefore, in the display apparatus according to the aspect of the present disclosure, light passing through the first lens 510 and the second lens 520 of each pixel area PA may not be reflected in a direction toward the substrate 10 due to a difference in a refractive index with the lens protection film 600.

Figure 10:
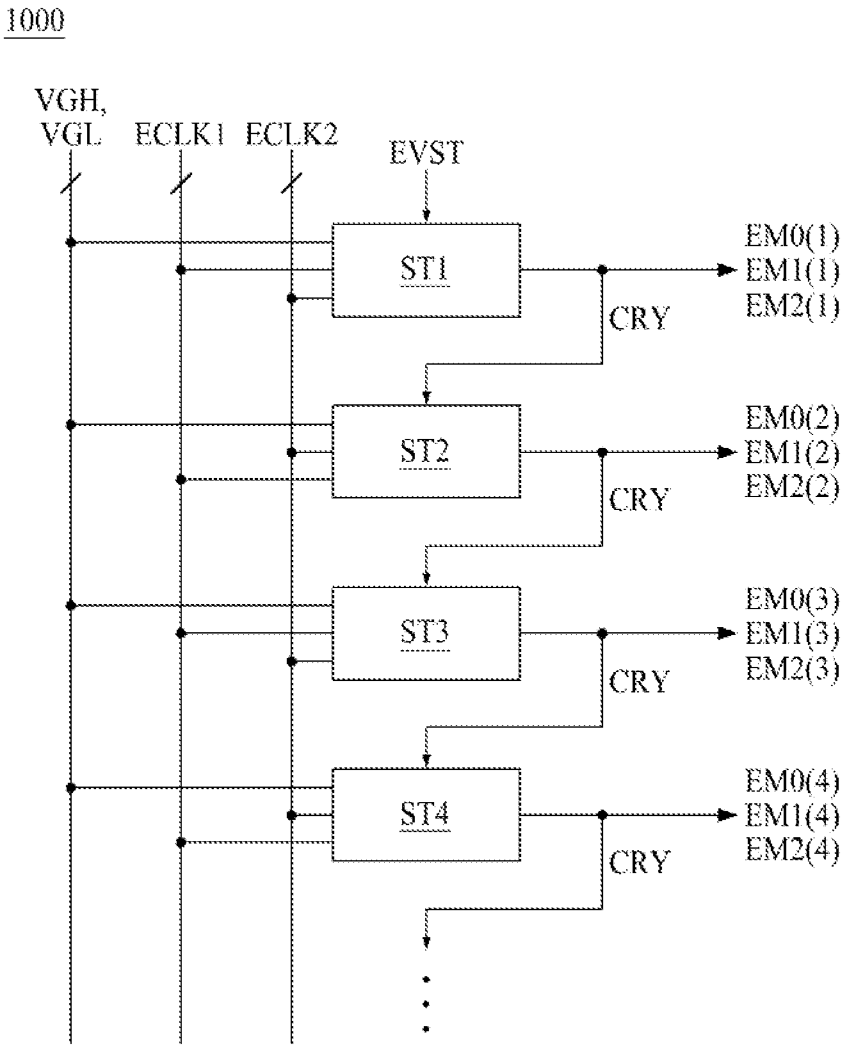
FIGS. 10 and 11 are conceptual views illustrating a gate driving circuit of a display apparatus according to the aspect of the present disclosure.
Figure 11:
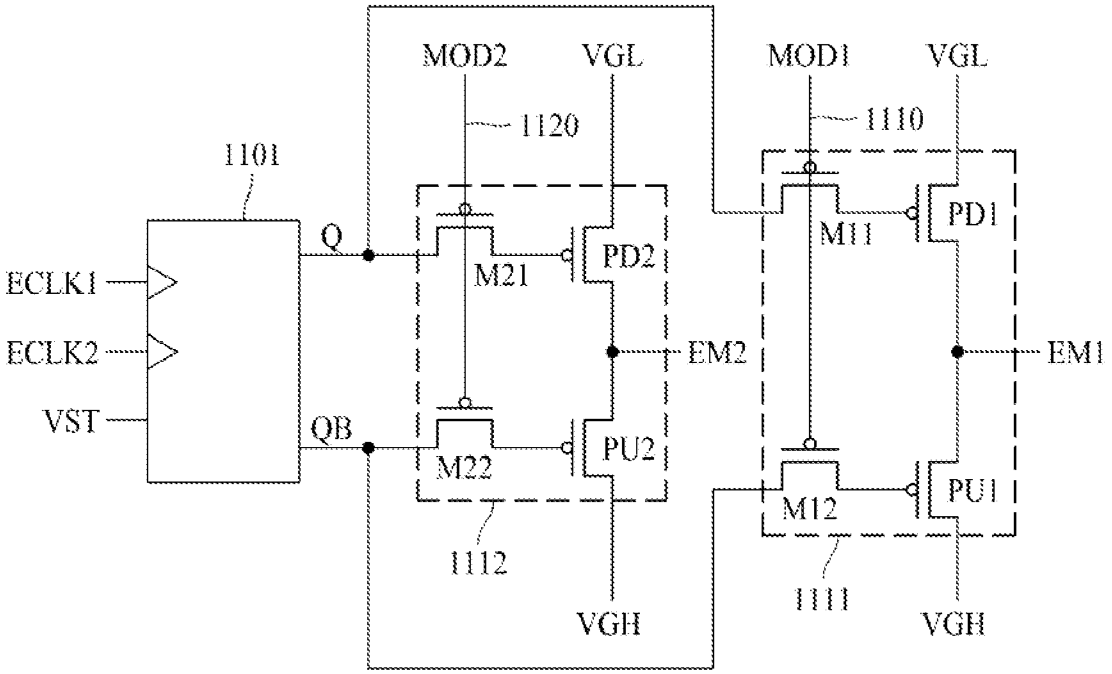

FIGS. 10 and 11 are conceptual views illustrating a gate driving circuit of a display apparatus according to the aspect of the present disclosure;

The gate driving circuit according to one aspect of the present disclosure may include a scan driver and an emission driver. The scan driver may generate scan signals (e. g., an (n) th scan signal Scan (n) and an (n−1) th scan signal Scan (n−1)). The emission driver may generate emission signals (e. g., a common emission signal EM0, a first emission signal EM1 and a second emission signal EM2). The gate driving circuit may control driving of a plurality of pixel circuits based on supply of the first emission signal EM1 and the second emission signal EM2 to each of the plurality of pixel circuits.

FIG. 10 illustrates a functional block diagram of the emission driver included in the gate driving circuit according to the aspect of the present disclosure. Referring to FIG. 10, an emission driver 1000 may be implemented as a gate shift register that includes a plurality of stages (e. g., a first stage ST1, a second stage ST2, a third stage ST3 and a fourth stage ST4). According to the aspect, the stage may be formed in a gate in panel (GIP) manner in which it is disposed inside a panel, but is not limited thereto, and the stage may be disposed to be distinguished from the panel.

The plurality of stages ST1 to ST4 may output emission signals (e. g., a first emission signal EM1, a second emission signal EM2 and a common emission signal EM0) as their operations are sequentially activated. In the aspect, the first stage ST1 may refer to a stage disposed at the top of the emission driver. Subsequently to the first stage ST1, the second to fourth stages ST2 to ST4 may be sequentially disposed.

In the aspect, the operation of the first stage ST1 may be activated in accordance with an external start signal EVST, and the second stage ST2 and the other stages (e. g., the third stage ST3 and the fourth stage ST4) may be activated in accordance with any one of the emission signals EM1, EM2 and EM0 of a previous stage. The emission signal of the previous stage is an internal start signal, and becomes a carry signal CRY. In this case, the term "previous stage" may refer to a stage which is positioned above a reference stage and generates an emission signal having a phase prior to that of an emission signal output from the reference stage.

Referring to FIG. 10, to output the emission signal, the plurality of stages ST1 to ST4 receive an external start signal EVST, a first clock signal ECLK1 and a second clock signal ECLK2 from a level shifter (not shown). The external start signal EVST, the first clock signal ECLK1 and the second clock signal ECLK2 may swing between a gate high voltage VGH and a gate low voltage VGL.

The external start signal EVST may be input to the first stage ST1, and the first clock signal ECLK1 and the second clock signal ECLK2 may be input to all the stages ST1 to ST4. The first clock signal ECLK1 and the second clock signal ECLK2 may have phases opposite to each other. According to the aspect, to normally operate the stages connected in a cascade manner, positions at which the first clock signal ECLK1 and the second clock signal ECLK2 are input may be set to be opposite to each other in odd-numbered stages and even-numbered stages. For example, when the first clock signal ECLK1 is input to a first terminal and the second clock signal ECLK2 is input to a second terminal at the odd-numbered stages, the first clock signal ECLK1 may be input to the second terminal and the second clock signal ECLK2 may be input to the first terminal at the even-numbered stages.

In the aspect, each of the stages ST1 to ST4 may activate an operation of a node Q in accordance with a start signal applied to a start terminal for every frame. In this case, the meaning that the node is activated may mean that a gate low potential (low) voltage VGL or a voltage corresponding thereto is applied to the node. The meaning that the node is non-activated means that a gate high potential (high) voltage VGH or a voltage corresponding thereto is applied to the node. The gate low potential voltage VGL may be referred to as a gate-on voltage, and the gate high potential voltage VGH may be referred to as a gate-off voltage.

According to the aspect, as shown, each of the stages ST1 to ST4 may be supplied with the gate high potential voltage VGH and the gate low potential voltage VGL from an external power supply (not shown). The gate high potential voltage VGH may be preset to a value between and 30V, and the gate low potential voltage VGL may be preset to a value between −10V and 0V, but the present disclosure is not limited thereto.

In the aspect, the gate low potential voltage VGL may be provided through a first voltage line that provides a voltage of the first value. According to the aspect, the first voltage line may be referred to as a low potential line. The gate high potential voltage VGH may be provided through a second voltage line providing a voltage of a second value higher than the first value. According to the aspect, the second voltage line may be referred to as a high potential line.

FIG. 11 is a brief circuit diagram illustrating a gate driving circuit according to the aspect of the present disclosure. In more detail, FIG. 11 is a circuit diagram illustrating one stage (e. g., the first stage ST1 of FIG. 10) included in the emission driver of the gate driving circuit.

Referring to FIG. 11, the gate driving circuit may include a node controller 1101, a first mode controller 1111 and a second mode controller 1112. The first mode controller 1111 may include a first pull-down transistor PD1, a first pull-up transistor PU1 and mode control transistors M11 and M12. The second mode controller 1112 may include a second pull-down transistor PD2, a second pull-up transistor PU2 and mode control transistors M21 and M22.

In the aspect, an internal circuit of the node controller 1101 may be configured to include a plurality of transistors. The internal circuit of the node controller 1101 may include a Q node, a QB node and a set node (or a start node). In some cases, the internal circuit of the node controller 1101 may further include a reset node to which a reset signal is input, an input node to which various voltages (e. g., driving voltage) are input, and the like.

In the aspect, the node controller 1101 may receive the gate start signal VST indicating the start of gate driving of the corresponding gate driver. A node to which the gate start signal VST is applied may be referred to as a set node. In this case, the gate start signal VST may include an external start signal (e. g., the external start signal EVST of FIG. 10) or a signal (e. g., a carry signal (e. g., the carry signal CRY of FIG. 10)) output from the element (e. g., the previous stage) of the gate driving circuit, which is prior to the current gate line, depending on the number of phases of the clock signal.

In the aspect, the node controller 1101 may receive the first clock signal ECLK1 and the second clock signal ECLK2.

In the aspect, the Q node of the node controller 1101 may be electrically connected to a gate node of a pull-down transistor (e. g., a first pull-down transistor PD1 and a second pull-down transistor PD2). The QB node of the node controller 1101 may be electrically connected to a gate node of a pull-up transistor (e. g., a first pull-up transistor PU1 and a second pull-up transistor PU2). The Q node and the QB node may be repeatedly charged and discharged.

In the aspect, a (1-1) th mode control transistor M11 may be disposed between the Q node and the first pull-down transistor PD1. For example, a first electrode of the (1-1) th mode control transistor M11 may be connected to the Q node, and a second electrode of the (1-1) th mode control transistor M11 may be connected to a gate electrode of the first pull-down transistor PD1. A gate electrode of the (1-1) th mode control transistor M11 may be connected to a first mode signal line 1110 to which a first mode signal MOD1 controlling an operation as a first mode is supplied. The (1-1) th mode control transistor M11 may be turned on or off based on the supply of the first mode signal MOD1.

A (2-1) th mode control transistor M21 may be disposed between the Q-node and the second pull-down transistor PD2. For example, a first electrode of the (2-1) th mode control transistor M21 may be connected to the Q node, and a second electrode of the (2-1) th mode control transistor M21 may be connected to a gate electrode of a second pull-down transistor PD2. A gate electrode of the (2-1) th mode control transistor M21 may be connected to a second mode signal line 1120 to which a second mode signal MOD2 controlling an operation as a second mode is supplied. The (2-1) th mode control transistor M21 may be turned on or off based on the supply of the second mode signal MOD2.

A (1-2) th mode control transistor M12 may be disposed between the QB node and the first pull-up transistor PU1. For example, a first electrode of the (1-2) th mode control transistor M12 may be connected to the QB node, and a second electrode of the (1-2) th mode control transistor M12 may be connected to a gate electrode of the first pull-up transistor PU1. A gate electrode of the (1-2) th mode control transistor M12 may be connected to the first mode signal line 1110 to which the first mode signal MOD1 controlling the operation as the first mode is supplied. The (1-2) th mode control transistor M12 may be turned on or off based on the supply of the first mode signal MOD1.

A (2-2) th mode control transistor M22 may be disposed between the QB node and the second pull-up transistor PU2. For example, a first electrode of the (2-2) th mode control transistor M22 may be connected to the QB node, and a second electrode of the (2-2) th mode control transistor M22 may be connected to a gate electrode of the second pull-up transistor PU2. A gate electrode of the (2-2) th mode control transistor M22 may be connected to the second mode signal line 1120 to which the second mode signal MOD2 controlling the operation as the second mode is supplied. The (2-2) th mode control transistor M22 may be turned on or off based on the supply of the second mode signal MOD2.

In this case, the first mode may mean a mode in which a viewing angle of a first light emitting element (e. g., the first light emitting element ED1 of FIG. 5 or 6) emitting light based on the supply of the first emission signal EM1 is greater than or equal to the first value. The first lens 510 described with reference to FIG. 8 may be disposed on the first light emitting element emitting light in a first mode to provide light at a wider viewing angle than a second mode that will be described later. The second mode may mean a mode in which a viewing angle of a second light emitting element (e. g., the second light emitting element ED2 of FIG. 5 or 6) emitting light based on the supply of the first emission signal EM1 is less than the first value. The second lens 520 described with reference to FIG. 9 may be disposed on the second light emitting element emitting light in the second mode to provide light at a viewing angle narrower than the second mode.

In the aspect, the first pull-down transistor PD1 and the second pull-down transistor PD2 may be connected to the first voltage line (or a low potential line). For example, the first electrode of each of the first pull-down transistor PD1 and the second pull-down transistor PD2 may be connected to the first voltage line (or the low potential line). The first pull-up transistor PU1 and the second pull-up transistor PU2 may be connected to a second voltage line (or a high potential line). For example, the first electrode of each of the first pull-up transistor PU1 and the second pull-up transistor PU2 may be connected to the second voltage line (or the high potential line).

According to the aspect, when the first pull-down transistor PD1 is turned on, the gate low potential voltage VGL may be provided as the first emission signal EM1. When the first pull-up transistor PU1 is turned on, the gate high potential voltage VGH may be provided as the first emission signal EM1. When the second pull-down transistor PD2 is turned on, the gate low potential voltage VGL may be provided as the second emission signal EM2. When the second pull-up transistor PU2 is turned on, the gate high potential voltage VGH may be provided as the second emission signal EM2. In this case, the gate high potential voltage VGH may be a voltage having a voltage value higher than that of the gate low potential voltage VGL. A value of each of the gate high potential voltage VGH and the gate low potential voltage VGL may be predesignated.

According to the aspect, at least one of the mode control transistors M11, M12, M21 and M22 may be omitted. A more detailed example related to this will be described with reference to FIG. 12 and/or FIG. 13. A more detailed example in which the mode control transistors M11, M12, M21 and M22 are included as shown in FIG. 11 may be described with reference to FIG. 14 and/or FIG. 15.

In the aspect, the transistors included in the gate driving circuit may be p-types. In this case, the transistor may be turned on when a signal applied to each transistor is a low level voltage, and the transistor may be turned off when a signal applied to each transistor is a high level voltage. Hereinafter, all of the transistors included in the gate driving circuit described in the present disclosure may be p-types, but the aspect is not limited thereto, and n-types may be also used in accordance with design change.

Also, the terms 'first electrode' and 'second electrode' of the transistors included in the gate driving circuit are used to distinguish the electrodes of the transistors. The first electrode and/or the second electrode may be distinguished for each transistor to be interpreted as a source electrode or a drain electrode, but the present disclosure is not limited thereto.

FIGS. 12 to 16 are views illustrating an example of a gate driving circuit of a display apparatus according to the aspect of the present disclosure. In more detail, FIGS. 12 to 16 illustrate various aspects of the gate driving circuit of FIG. 11. Hereinafter, a redundant description of the previous description may be omitted.

Figure 12:
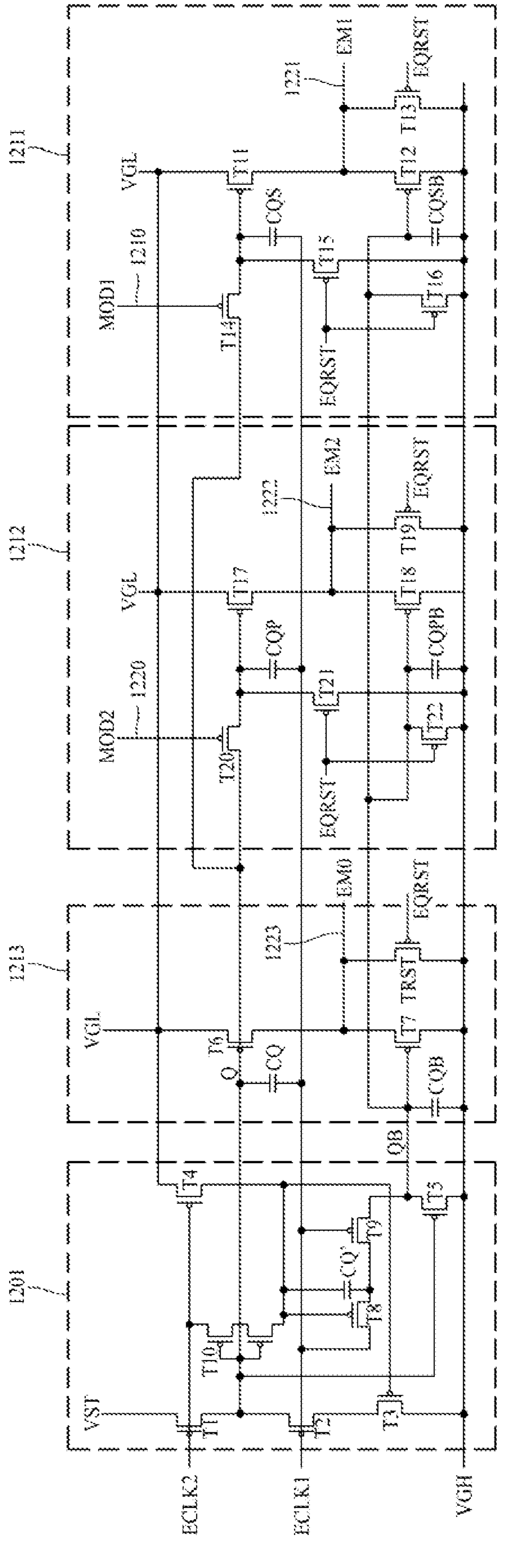
FIGS. 12 to 16 are views illustrating examples of a gate driving circuit of a display apparatus according to the aspect of the present disclosure.

FIG. 12 is one aspect of a gate driving circuit of a display apparatus according to the aspect of the present disclosure. Referring to FIG. 12, the gate driving circuit may include at least one of a node controller 1201 (e. g., the node controller 1101 of FIG. 11), a first mode controller 1211 (e. g., the first mode controller 1111 of FIG. 11), a second mode controller 1212 (e. g., the second mode controller 1112 of FIG. 11) and a common signal controller 1213.

In the aspect, the node controller 1201 may receive various control signals. For example, the node controller 1201 may receive the clock signals ECLK1 and ECLK2, the gate start signal VST and the gate high potential voltage VGH. The node controller 1201 may control the elements (e. g., the first mode controller 1211 and the second mode controller 1212) connected to the node controller 1201 based on control signals applied thereto. The node controller 1201 may control the potential of the Q node and the potential of the QB node by using at least one of the gate start signal VST, the first clock signal ECLK1 and the second clock signal ECLK2.

In the aspect, the first electrode of the first transistor T1 may receive the gate start signal VST. The first transistor T1 may be turned on or off based on the supply of the second clock signal ECLK2.

The first electrode of the second transistor T2 may be connected to the second electrode of the first transistor T1. The second transistor T2 may receive the gate start signal VST in response to turn-on of the first transistor T1. The second transistor T2 may be turned on or off based on the supply of the first clock signal ECLK1.

The first electrode of the third transistor T3 may be connected to the second electrode of the second transistor T2. The third transistor T3 may receive the gate start signal VST through the second transistor T2 in response to turn-on of the second transistor T2. The second electrode of the third transistor T3 may be connected to the high potential line supplying the gate high potential voltage VGH.

The fourth transistor T4 may be turned on or off based on the supply of the second clock signal ECLK2. The first electrode of the fourth transistor T4 may be connected to the low potential line supplying the gate low potential voltage VGL. The second electrode of the fourth transistor T4 may be connected to the gate electrode of the third transistor T3. When the fourth transistor T4 is turned on, the gate low potential voltage VGL may be provided to the gate electrode of the third transistor T3.

The gate electrode of the fifth transistor T5 may be connected to the first transistor T1, the second transistor T2 and the tenth transistor T10. The gate electrode of the fifth transistor T5 may be supplied with the gate start signal VST in response to turn-on of the first transistor T1. The first electrode of the fifth transistor T5 may be connected to the ninth transistor T9 and the common signal controller 1213. The second electrode of the fifth transistor T5 may be connected to the high potential line supplying the gate high potential voltage VGH.

The first electrode of the eighth transistor T8 may be connected to a line providing the first clock signal ECLK1. The second electrode of the eighth transistor T8 may be connected to the ninth transistor T9 and a node control capacitor CQ'. The gate electrode of the eighth transistor T8 may be connected to the second electrode of the tenth transistor T10. The eighth transistor T8 may receive the second clock signal ECLK2 in response to turn-on of the tenth transistor T10.

The first electrode of the ninth transistor T9 may be connected to the second electrode of the eighth transistor T8 and the node control capacitor CQ'. The second electrode of the ninth transistor T9 may be connected to the fifth transistor T5 and the common signal controller 1213. The gate electrode of the ninth transistor T9 may be turned on or off based on supply of the first clock signal ECLK1.

The first electrode of the tenth transistor T10 may be connected to a line providing the second clock signal ECLK2 and the fourth transistor T4. The second electrode of the tenth transistor T10 may be connected to the third transistor T3, the fourth transistor T4, the eighth transistor T8 and the node control capacitor CQ'. According to one aspect, the tenth transistor T10 may include a dual gate, but is not limited thereto.

In the aspect, a node to which the second electrode of the first transistor T1, the first electrode of the second transistor T2, the gate electrode of the fifth transistor T5 and the gate electrode of the tenth transistor T10 are connected may be referred to as the Q node (or a first node). The Q node may be connected to the first mode controller 1211, the second mode controller 1212 and the common signal controller 1213. A node to which the first electrode of the fifth transistor T5 and the second electrode of the ninth transistor T9 are connected may be referred to as the QB node or a second node. The QB node may be connected to the first mode controller 1211, the second mode controller 1212 and the common signal controller 1213.

Referring to FIG. 12, the Q node may be connected to a fourteenth transistor T14 of the first mode controller 1211, a twentieth transistor T20 of the second mode controller 1212 and a sixth transistor T6 of the common signal controller 1213. In one aspect, a second capacitor CQ of the common signal controller 1213 may be further connected to the Q node.

A twelfth transistor T12, a sixteenth transistor T16 and a first mode pull-up capacitor CQSB of the first mode controller 1211 may be connected to the QB node. A twenty-second transistor T22, an eighteenth transistor T18 and a second mode pull-up capacitor CQPB of the second mode controller 1212 may be connected to the QB node. A seventh transistor T7 and a third capacitor CQB of the common signal controller 1213 may be connected to the QB node.

In the aspect, the first mode controller 1211 may be supplied with the first mode signal MOD1. The first mode controller 1211 may output a first emission signal EM1 based on at least one of a potential of the Q node and a potential of the QB node to the first output line 1221 in response to reception of the first mode signal MOD1. The fourteenth transistor T14 may be turned on or off based on the supply of the first mode signal MOD1. The gate electrode of the fourteenth transistor T14 may be connected to a first mode signal line 1210 providing the first mode signal MOD1. The fourteenth transistor T14 may correspond to the (1-1) th mode control transistor M11 of FIG. 11. In one aspect, the first mode signal MOD1 may include a signal that causes the display apparatus to operate in the first mode. In this case, the first mode controller 1211 may control the display apparatus to operate in the first mode.

In the aspect, an eleventh transistor T11 of the first mode controller 1211 may correspond to the first pull-down transistor PD1 of FIG. 11. A first electrode of the eleventh transistor T11 may be connected to the low potential line supplying the gate low potential voltage VGL. When the eleventh transistor T11 is turned on, the gate low potential voltage VGL may be provided to the pixel circuit (e. g., the pixel circuit of FIG. 5 or FIG. 6) as the first emission signal EM1 through a second electrode of the eleventh transistor T11.

In the aspect, the first mode controller 1211 may output the first emission signal EM1 to a first output line 1221 based on at least one of a potential of the Q node and a potential of the QB node. The first output line 1221 may be connected to the pixel circuit, and accordingly, the first emission signal EM1 may be provided to the pixel circuit. The transistor of the pixel circuit for receiving the first emission signal EM1, for example, the first transistor T1 of FIG. 6 may be referred to as a first light emission control transistor in accordance with the aspect, but is not limited thereto.

For example, the twelfth transistor T12 of the first mode controller 1211 may correspond to the first pull-up transistor PU1 of FIG. 11. A gate electrode of the twelfth transistor T12 may be connected to the QB node. The twelfth transistor T12 may be turned on or off based on signal supply (e. g., the first clock signal ECLK1) through the QB node. A first electrode of the twelfth transistor T12 may be connected to the high potential line supplying the gate high potential voltage VGH. When the twelfth transistor T12 is turned on, the gate high potential voltage VGH may be provided to the pixel circuit as the first emission signal EM1 through a second electrode of the twelfth transistor T12.

In the aspect, the eleventh transistor T11 may be connected between the first voltage line providing the voltage of the first value and the first output line 1221. In this case, the first voltage line may correspond to a low potential line, and the first value may correspond to the gate low potential voltage VGL. The twelfth transistor T12 may be controlled by the potential of the QB node, and may be connected between the first output line 1221 and the second voltage line providing a voltage of the second value higher than the first value. The second voltage line may correspond to the high potential line, and the second value may correspond to the gate high potential voltage VGH.

In the aspect, a gate electrode of the eleventh transistor T11 may be connected to a first mode pull-down capacitor CQS and a fifteenth transistor T15. The first mode controller 1211 may include an element related to a reset of a circuit. For example, the first mode controller 1211 may include a thirteenth transistor T13, a fifteenth transistor T15 and a sixteenth transistor T16, which receive a reset signal EQRST. The thirteenth transistor T13, the fifteenth transistor T15 and the sixteenth transistor T16 may be turned on or off based on the reset signal EQRST.

According to the aspect, the thirteenth transistor T13 receiving the reset signal EQRST may be referred to as a first reset transistor. The thirteenth transistor T13 may be controlled by the reset signal EQRST. The thirteenth transistor T13 may initialize the first output line 1221 based on control by the reset signal EQRST. The reset signal EQRST may be implemented as a specific voltage value, and may be referred to as a reset voltage in some cases, but is not limited thereto.

In the aspect, the second mode controller 1212 may be supplied with the second mode signal MOD2. The second mode controller 1212 may output a second emission signal EM2 based on at least one of a potential of the Q node and a potential of the QB node to the second output line 1222 in response to reception of the second mode signal MOD2. The twentieth transistor T20 may be turned on or off based on the supply of the second mode signal MOD2. The gate electrode of the twentieth transistor T20 may be connected to a second mode signal line 1220 providing the second mode signal MOD2. The twentieth transistor T20 may correspond to the (2-1) th mode control transistor M21 of FIG. 11. In one aspect, the second mode signal MOD2 may include a signal that causes the display apparatus to operate in the second mode. In this case, the second mode controller 1212 may control the display apparatus to operate in the second mode.

In the aspect, a seventeenth transistor T17 of the second mode controller 1212 may correspond to the second pull-down transistor PD2 of FIG. 11. A first electrode of the seventeenth transistor T17 may be connected to the low potential line supplying the gate low potential voltage VGL. When the seventeenth transistor T17 is turned on, the gate low potential voltage VGL may be provided to the pixel circuit (e. g., the pixel circuit of FIG. 5 or FIG. 6) as the second emission signal EM2 through a second electrode of the seventeenth transistor T17.

In the aspect, an eighteenth transistor T18 of the second mode controller 1212 may correspond to the second pull-up transistor PU2 of FIG. 11. A gate electrode of the eighteenth transistor T18 may be connected to the QB node. The eighteenth transistor T18 may be turned on or off based on signal supply (e. g., the first clock signal ECLK1) through the QB node. A first electrode of the eighteenth transistor T18 may be connected to the high potential line supplying the gate high potential voltage VGH. When the eighteenth transistor T18 is turned on, the gate high potential voltage VGH may be provided to the pixel circuit as the second emission signal EM2 through the second electrode of the eighteenth transistor T18.

In the aspect, the second mode controller 1212 may output the second emission signal EM2 to the second output line 1222 based on at least one of the potential of the Q node and the potential of the QB node. The second output line 1222 may be connected to the pixel circuit, and accordingly, the second emission signal EM2 may be provided to the pixel circuit. A transistor of the pixel circuit for receiving the second emission signal EM2, for example, the second transistor T2 of FIG. 6, may be referred to as a second light emission control transistor in accordance with the aspect, but is not limited thereto.

In the aspect, a gate electrode of the seventeenth transistor T17 may be connected to the second mode pull-down capacitor CQP and the twenty-first transistor T21. The second mode controller 1212 may include an element related to a reset of a circuit. For example, the second mode controller 1212 may include the twenty-first transistor T21, the twenty-second transistor T22 and the nineteenth transistor T19, which receive the reset signal EQRST. The twenty-first transistor T21, the twenty-second transistor T22 and the nineteenth transistor T19 may be turned on or off based on the reset signal EQRST.

According to the aspect, the nineteenth transistor T19, which receives the reset signal EQRST, may be referred to as a second reset transistor. The nineteenth transistor T19 may be controlled by the reset signal EQRST. The nineteenth transistor T19 may initialize the second output line 1222 based on control by the reset signal EQRST.

In the aspect, the common signal controller 1213 may include a sixth transistor T6, a seventh transistor T7 and a reset transistor TRST. The sixth transistor T6 may operate as a pull-down transistor, and the seventh transistor T7 may operate as a pull-up transistor. The reset transistor TRST may operate as a transistor that resets the common signal controller 1213. The common signal controller 1213 may output a common emission signal EM0 to a third output line 1223 based on the potential of the Q node and the potential of the QB node.

In the aspect, the first electrode of the sixth transistor T6 may be connected to the low potential line providing the gate low potential voltage VGL. The sixth transistor T6 may be turned on or off based on a signal provided to the Q node. When the sixth transistor T6 is turned on, the gate low potential voltage VGL may be provided to the pixel circuit as the common emission signal EM0 through the second electrode of the sixth transistor T6.

In the aspect, the first electrode of the seventh transistor T7 may be connected to the high potential line for providing the gate high potential voltage VGH. The seventh transistor T7 may be turned on or off based on the signal provided to the QB node. When the seventh transistor T7 is turned on, the gate high potential voltage VGH may be provided to the pixel circuit as the common emission signal EM0 through the second electrode of the seventh transistor T7.

In the aspect, the common emission signal EM0 may be provided at a predetermined cycle. For example, the common emission signal EM0 may be provided to the pixel circuit at constant time intervals regardless of the supply of the first mode signal MOD1 or the second mode signal MOD2.

In the aspect, the common emission signal EM0 may be output to a third output line 1223. The third output line 1223 may be connected to the pixel circuit, and accordingly, the common emission signal EM0 may be provided to the pixel circuit.

Figure 13:
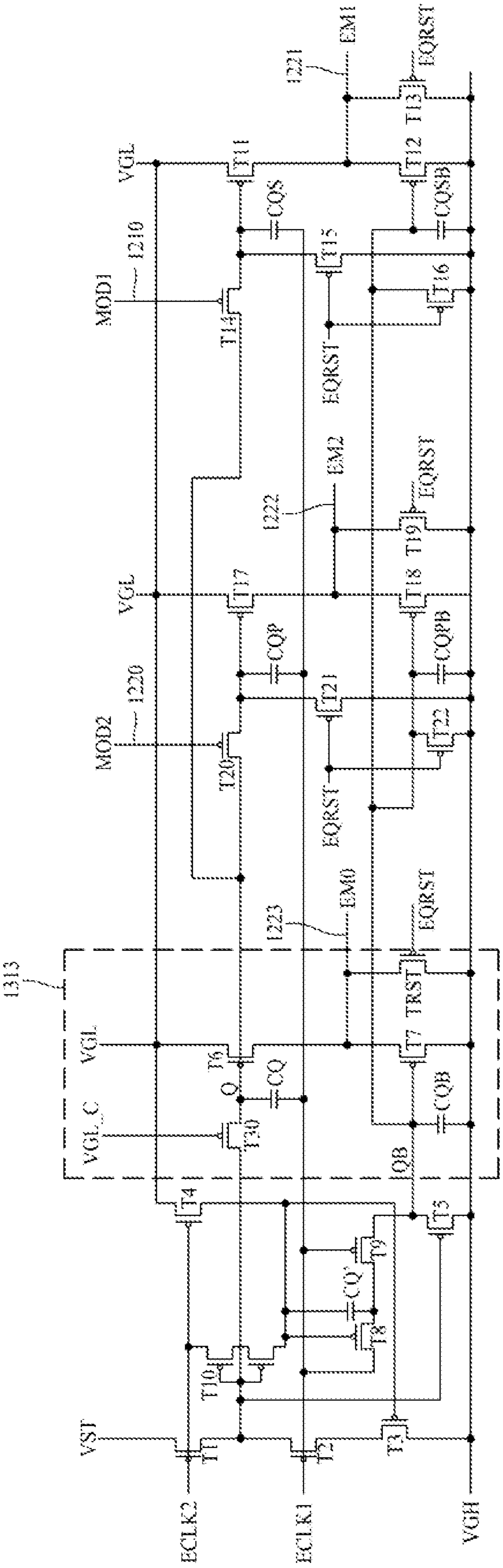

FIG. 13 is another aspect of a gate driving circuit of a display apparatus according to the present disclosure. Hereinafter, the description made with reference to the aspect of FIG. 12 may be omitted in FIG. 13, and the description will be given based on the elements that are additionally disposed.

Referring to FIG. 13, the common signal controller 1313 may include a first common control transistor T30. The first common control transistor T30 may be connected to the gate electrode of the sixth transistor T6. The first electrode of the first common control transistor T30 may be connected to the second electrode of the first transistor T1, the first electrode of the second transistor T2 and the gate electrode of the tenth transistor T10. A second electrode of the first common control transistor T30 may be connected to the second capacitor CQ and the gate electrode of the sixth transistor T6.

In the aspect, the first common control transistor T30 may control the supply of the common emission signal EM0. For example, a gate electrode of the first common control transistor T30 may receive a common control signal VGL_C. The first common control transistor T30 may be turned on or off based on the reception of the common control signal VGL_C. For example, the first common control transistor T30 may be turned on when the common control signal VGL_C is at a low level, and may be turned off when the common control signal VGL_C is at a high level. A signal may be supplied to the gate electrode of the sixth transistor T6 based on turn-on of the first common control transistor T30, and the sixth transistor T6 may be turned on or off based on the signal supply.

Figure 14:
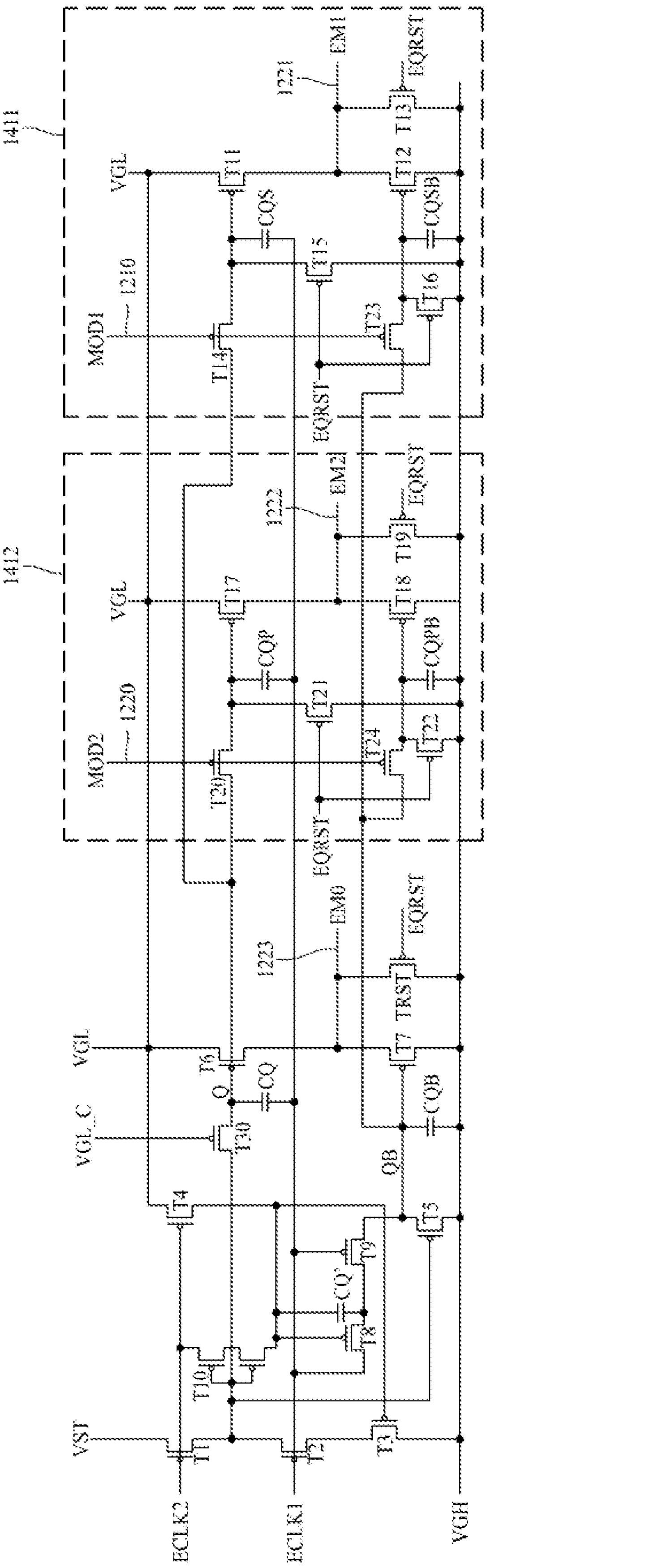

FIG. 14 is another aspect of a gate driving circuit of a display apparatus according to the present disclosure. Hereinafter, the description made with reference to the aspect of FIGS. 12 and 13 may be omitted in FIG. 14, and the description will be given based on the elements that are additionally disposed.

Referring to FIG. 14, the first mode controller 1411 may further include a twenty-third transistor T23. The twenty-third transistor T23 may be turned on or off based on the supply of the first mode signal MOD1. For example, the twenty-third transistor T23 may be turned off when the first mode signal MOD1 is at a high level, and may be turned on when the first mode signal MOD1 is at a low level.

Turn-on or off of the twelfth transistor T12 may be controlled based on the operation of the twenty-third transistor T23. For example, a signal applied to the first electrode of the twenty-third transistor T23 may be provided to the gate electrode of the twelfth transistor T12 in response to turn-on of the twenty-third transistor T23. Therefore, turn-on or off of the twelfth transistor T12 may be controlled.

In the aspect, the second mode controller 1412 may further include a twenty-fourth transistor T24. The twenty-fourth transistor T24 may be turned on or off based on the supply of the second mode signal MOD2. For example, the twenty-fourth transistor T24 may be turned off when the second mode signal MOD2 is at a high level, and may be turned on when the second mode signal MOD2 is at a low level.

Turn-on or off of the eighteenth transistor T18 may be controlled based on the operation of the twenty-fourth transistor T24. For example, a signal applied to the first electrode of the twenty-fourth transistor T24 may be provided to the gate electrode of the eighteenth transistor T18 in response to turn-on of the twenty-fourth transistor T24. Therefore, turn-on or off of the eighteenth transistor T18 may be controlled.

Figure 15:
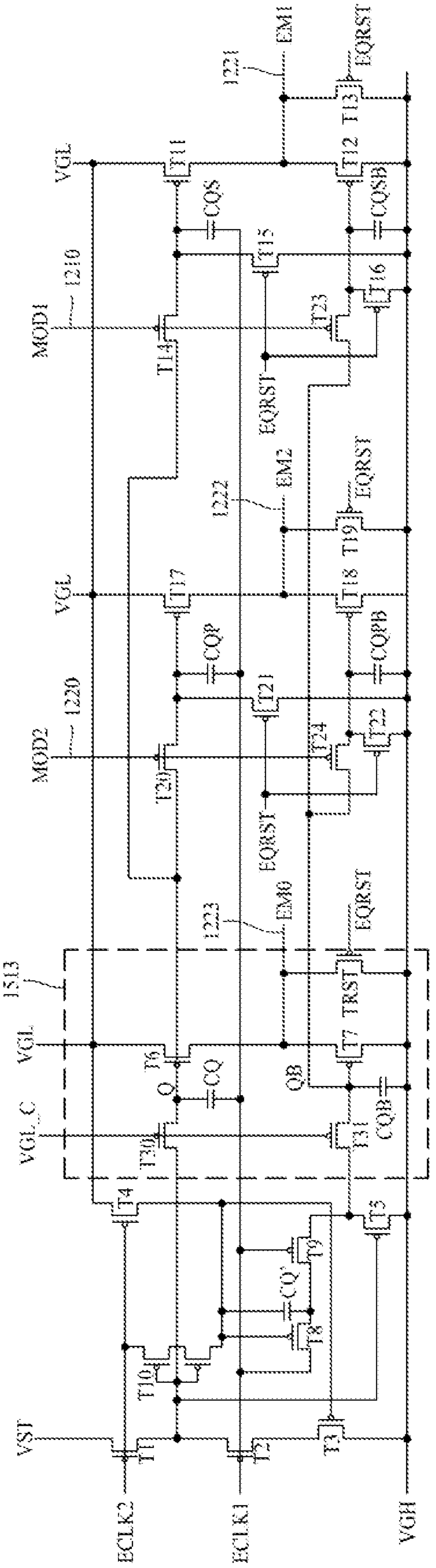

FIG. 15 is another aspect of a gate driving circuit of a display apparatus according to the present disclosure. Hereinafter, the description made with reference to the aspect of FIGS. 12 to 14 may be omitted in FIG. 15, and the description will be given based on the elements that are additionally disposed.

Referring to FIG. 15, the common signal controller 1513 may include a first common control transistor T30 and a second common control transistor T31. The first common control transistor T30 has been described with reference to FIG. 13 and thus its detailed description will be omitted.

In the aspect, the second common control transistor T31 may be connected to the gate electrode of the seventh transistor T7. A first electrode of the second common control transistor T31 may be connected to the first electrode of the fifth transistor T5 and the second electrode of the ninth transistor T9. A second electrode of the second common control transistor T31 may be connected to the third capacitor CQB and the gate electrode of and the seventh transistor T7.

In the aspect, the second common control transistor T31 may control the supply of the common emission signal EM0. For example, a gate electrode of the second common control transistor T31 may receive the common control signal VGL_C. The second common control transistor T31 may be turned on or off based on the reception of the common control signal VGL_C. For example, the second common control transistor T31 may be turned on when the common control signal VGL_C is at a low level, and may be turned off when the common control signal VGL_C is at a high level. A signal may be supplied to the gate electrode of the seventh transistor T7 based on turn-on of the second common control transistor T31, and the seventh transistor T7 may be turned on or off based on the signal supply.

Figure 16:
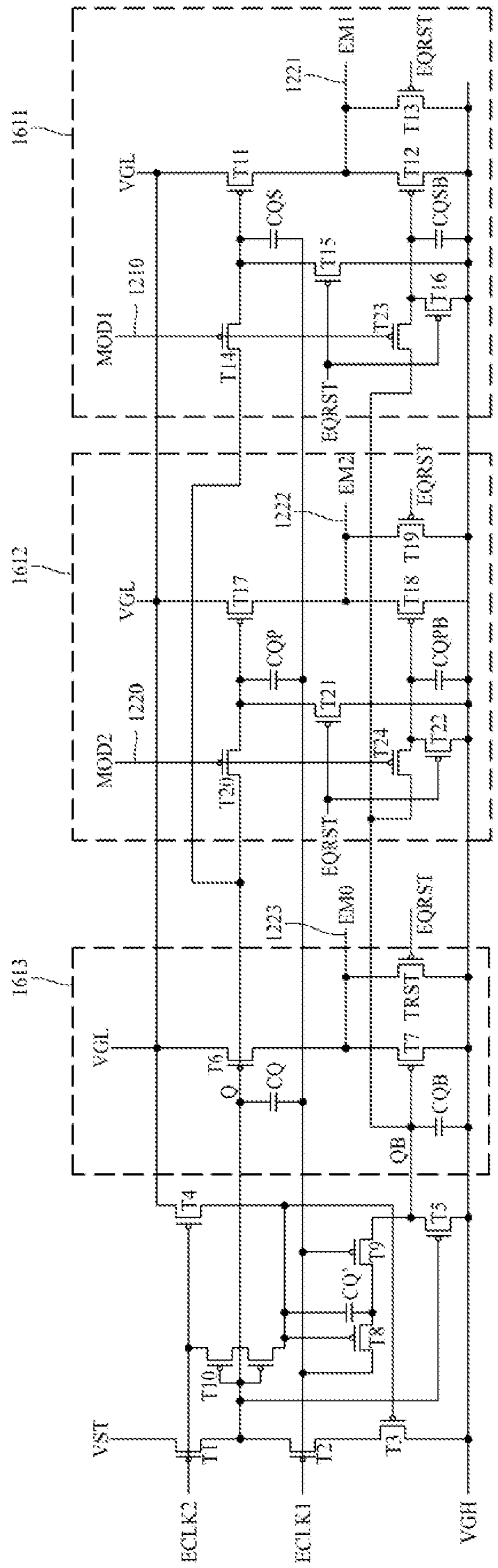

FIG. 16 is another aspect of a gate driving circuit of a display apparatus according to the present disclosure. Hereinafter, the description made with reference to the aspect of FIGS. 12 to 15 may be omitted in FIG. 16, and the description will be given based on the elements that are additionally disposed.

Referring to FIG. 16, a first mode controller 1611 may correspond to the first mode controller 1411 of FIG. 14. A second mode controller 1612 may correspond to the second mode controller 1412 of FIG. 14. A common signal controller 1613 may correspond to the common signal controller 1213 of FIG. 12. For example, the common signal controller 1613 may mean that the first common control transistor T30 of the common signal controller 1313 of FIG. 13 is omitted.

In the aspect, the first mode controller 1611 may further include a twenty-third transistor T23. The second mode controller 1612 may further include a twenty-fourth transistor T24. The common signal controller 1613 may include a sixth transistor T6, a seventh transistor T7 and a reset transistor TRST. The sixth transistor T6 may operate as a pull-down transistor, and the seventh transistor T7 may operate as a pull-up transistor.

Figure 17:
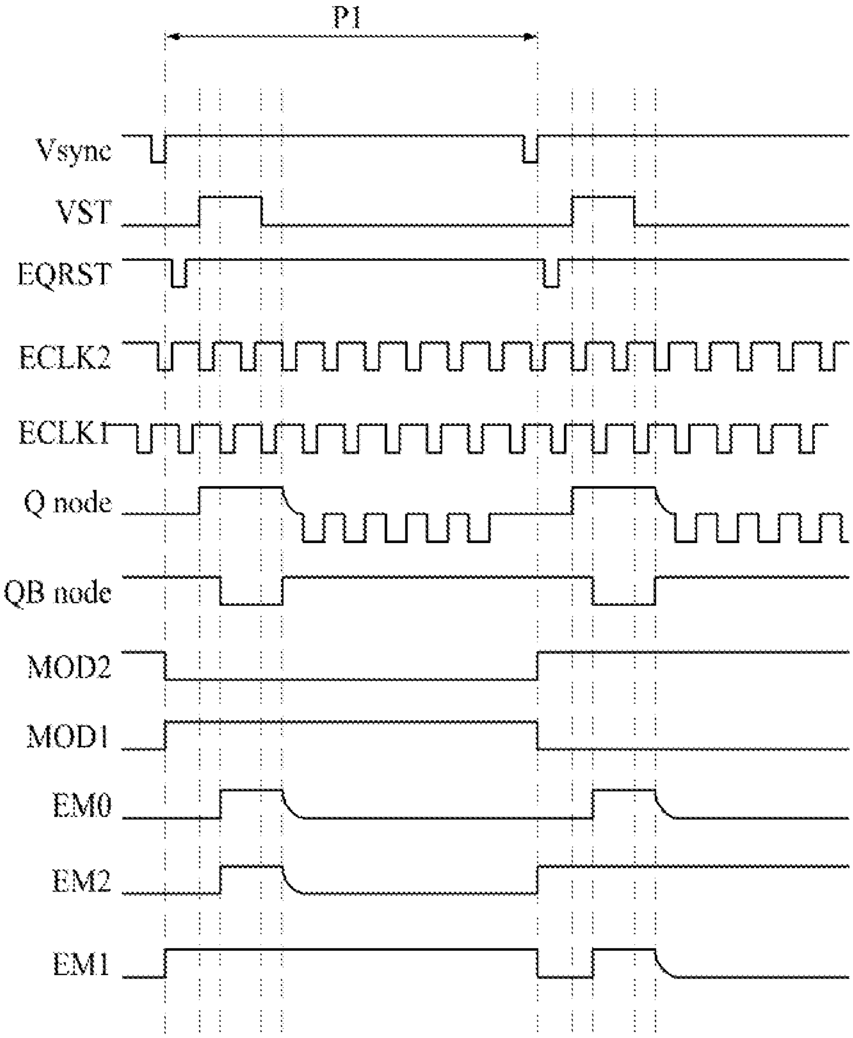
FIG. 17 is a view illustrating an example of a signal flow of a display apparatus according to the aspect of the present disclosure.

FIG. 17 is a view illustrating an example of a signal flow of a display apparatus according to the aspect of the present disclosure. In detail, FIG. 17 illustrates an example of a signal flow related to the gate driving circuit of the aspect of FIG. 12.

Referring to FIG. 17, a synchronization signal Vsync for synchronizing signals related to the gate driving circuit may be input at intervals of a first period P1. The gate start signal VST and the reset signal EQRST may be input to the gate driving circuit at intervals of the first period P1. A time point at which a level of each of the gate start signal VST and the reset signal EQRST changes, for example, a time point at which a signal is changed from a high level to a low level or a time point at which a signal is changed from a low level to a high level may be different as shown.

The first clock signal ECLK1 and the second clock signal ECLK2 may be input to the gate driving circuit at constant intervals. In the aspect, at least a portion of a period corresponding to a high level of the first clock signal ECLK1 may overlap with at least a portion of a period corresponding to a low level of the second clock signal ECLK2. At least a portion of a period corresponding to a low level of the first clock signal ECLK1 may overlap with at least a portion of a period corresponding to a high level of the second clock signal ECLK2. A length of an overlap period may be predesignated.

In the aspect, signals of the Q node and the QB node may be repeated at intervals of the first period P1. According to FIG. 17, the QB node may be a low level in at least a portion of a period at which the Q node is at a high level. The QB node may be at a high level in at least a portion of a period at which the Q node is at a low level.

In the aspect, the first mode signal MOD1 may have a level opposite to the second mode signal MOD2. For example, when the first mode signal MOD1 is at a high level, the second mode signal MOD2 may be at a low level. When the first mode signal MOD1 is at a low level, the second mode signal MOD2 may be at a high level. In one aspect, a period at which the first mode signal MOD1 is at a high level or the second mode signal MOD2 is at a low level may include a period at which the display apparatus is driven in the second mode. A period at which the first mode signal MOD1 is at a low level or the second mode signal MOD2 is at a high level may include a period in which the display apparatus is driven in the first mode.

In this case, the first mode may include a mode in which light by the light emitting element is provided at a viewing angle wider than that of the second mode. For example, the first mode may include a mode in which light is emitted using the first light emitting element ED1 of FIG. 5 or 6. The second mode may include a mode in which light by the light emitting element is provided at a viewing angle narrower than that of the first mode. For example, the second mode may include a mode in which light is emitted using the second light emitting element ED2 of FIG. 5 or 6.

In the aspect, the first emission signal EM1 may be at a high level when the first mode signal MOD1 is at a high level. At least a partial period of the first emission signal EM1 may be at a low level when the first mode signal MOD1 is at a low level. The second emission signal EM2 may be at a high level when the second mode signal MOD2 is at a high level. At least a partial period of the second emission signal EM2 may be at a low level when the second mode signal MOD2 is at a low level. At least a partial period of the common emission signal EM0 may operate at a low level or a high level at intervals of the first period P1. For example, the common emission signal EM0 may be provided to the pixel circuit at intervals of the first period regardless of the level of the first emission signal EM1 or the second emission signal EM2.

According to the aspect, as shown in FIGS. 13 to 16, the gate driving circuit may further include a transistor related to the control of the common emission signal EM0. For example, the gate driving circuit may include at least one of the first common control transistor T30 and the second common control transistor T31. In this case, the common control signal VGL_C for controlling the first common control transistor T30 and the second common control transistor T31 may be input. In this case, the common emission signal EM0 of FIG. 17 may operate at a high level or a low level based on the input of the common control signal VGL_C. For example, the common emission signal EM0 may be at a high level when the common control signal VGL_C is at a high level. The common emission signal EM0 may be at a low level in at least a partial period when the common control signal VGL_C is at a low level.

The gate driving circuit for controlling the driving of the pixel circuit of the display apparatus according to the aspect of the present disclosure may include a first mode controller (e. g., the first mode controller 1211 of FIG. 12) for outputting a first emission signal (e. g., the first emission signal EM1 of FIG. 12) based on a potential of a first node (e. g., the Q node of FIG. 12) or a second emission signal (e. g., the second emission signal EM2 of FIG. 12) based on a potential of a second node (e. g., the QB node) of FIG. 12 in response to reception of a first mode signal (e. g., the first mode signal MOD1 of FIG. 12), a second mode controller (e. g., the second mode controller 1212 of FIG. 12) for outputting a first emission signal based on the potential of the first node or the second emission signal based on the potential of the second node in response to reception of a second mode signal (e. g., the second mode signal MOD2 of FIG. 12), and a node controller (e. g., the node controller 1201 of FIG. 12) for controlling the potentials of the first node and the second node by using at least one of a start signal (e. g., the gate start signal VST of FIG. 12), a first clock signal (e. g., the first clock signal ECLK1 of FIG. 12) and a second clock signal (e. g., the second clock signal ECLK2 of FIG. 12).

According to some aspects of the present disclosure, the first mode controller may include a first mode control transistor (e. g., the fourteenth transistor T14 of FIG. 12) connected to a first mode signal line for providing the first mode signal, a first transistor (e. g., the eleventh transistor T11 of FIG. 12) connected to a first voltage line providing the voltage of the first value, and a second transistor (e. g., the twelfth transistor T12 of FIG. 12) connected to a second voltage line providing the voltage of the second value higher than the first value.

According to some aspects of the present disclosure, the first mode controller may further include a third transistor (e. g., the fifteenth transistor T15, the sixteenth transistor T16 and/or the thirteenth transistor T13) for initializing the first mode controller, a first capacitor (e. g., the first mode pull-down capacitor CQS) connected to the gate electrode of the first transistor, and a second capacitor (e. g., the first mode pull-up capacitor CQSB) connected to the gate electrode of the second transistor. The first electrode of the first transistor may be connected to the first voltage line, the second electrode of the first transistor may be connected to the second transistor, the first electrode of the second transistor may be connected to the second voltage line, and the second electrode of the second transistor may be connected to the first transistor. The first electrode of the second capacitor may be connected to the first electrode of the second transistor, and the second electrode of the second capacitor may be connected to a gate electrode of the second transistor.

According to some aspects of the present disclosure, the second mode controller may include a second mode control transistor (e. g., the twentieth transistor T20) connected to a second mode signal line providing a second mode signal (e. g., the second mode signal MOD2 of FIG. 12), a fourth transistor (e. g., the seventeenth transistor T17 of FIG. 12) connected to the first voltage line providing the voltage of the first value, and a fifth transistor (e. g., the eighteenth transistor T18 of FIG. 12) connected to the second voltage line providing the voltage of the second value higher than the first value.

According to some aspects of the present disclosure, the second mode controller may further include a sixth transistor (e. g., the nineteenth transistor T19, the twenty-first transistor T21 and/or the twenty-second transistor T22 of FIG. 12) for initializing the second mode controller, a third capacitor (e. g., the second mode pull-down capacitor CQP of FIG. 12) connected to the gate electrode of the fourth transistor, and a fourth capacitor (e. g., the second mode pull-up capacitor CQPB of FIG. 12) connected to the gate electrode of the fifth transistor.

According to some aspects of the present disclosure, the first mode controller may be connected to the first light emitting element (e. g., the first light emitting element ED1 of FIG. 5 or 6) included in the pixel circuit, and the second mode controller may be connected to the second light emitting element (e. g., the second light emitting element ED2 of FIG. 5 or 6) included in the pixel circuit. A first lens (e. g., the first lens 510 of FIG. 8) may be disposed on the first light emitting element, and a second lens (e. g., the second lens 520 of FIG. 9) may be disposed on the second light emitting element. A viewing angle of an area in which the first light emitting element is disposed may correspond to a first value by the first lens, and a viewing angle of an area in which the second light emitting element is disposed may correspond to a second value smaller than the first value by the second lens.

According to some aspects of the present disclosure, the gate driving circuit may further include a common signal controller (e. g., the common signal controller 1213 of FIG. 12) for outputting a common emission signal (e. g., the common emission signal EM0 in FIG. 12) based on the potential of the first node and the potential of the second node.

According to some aspects of the present disclosure, the start signal may include at least one emission signal output from the previous stage.

According to some aspects of the present disclosure, the gate driving circuit may further include a scan output unit for outputting a scan signal.

The gate driving circuit and the display apparatus according to the present disclosure may provide a signal for controlling the pixel circuit including a plurality of light emitting elements.

A display panel according to the aspect of the present disclosure may include a plurality of pixel circuits, and a gate driving circuit configured to control driving of the plurality of pixel circuits based on supply of a first emission signal and a second emission signal to each of the plurality of pixel circuits, wherein the gate driving circuit includes a first mode controller configured to output the first emission signal based on at least one of a potential of a first node and a potential of a second node to a first output line in response to reception of a first mode signal, a second mode controller configured to output the second emission signal based on at least one of the potential of the first node and the potential of the second node to a second output line in response to reception of a second mode signal, and a controller configured to control the potential of the first node and the potential of the second node by using at least one of a start signal, a first clock signal and a second clock signal.

According to some aspects of the present disclosure, a display apparatus may be disposed in at least a portion of a transport means, providing at least one content, and the display apparatus may include a plurality of pixel circuits, and a gate driving circuit configured to control driving of the plurality of pixel circuits based on supply of a first emission signal and a second emission signal to each of the plurality of pixel circuits, wherein the gate driving circuit includes a first mode controller configured to output the first emission signal based on at least one of a potential of a first node and a potential of a second node to a first output line in response to reception of a first mode signal, a second mode controller configured to output the second emission signal based on at least one of the potential of the first node and the potential of the second node to a second output line in response to reception of the second mode signal, and a controller configured to control the potential of the first node and the potential of the second node by using at least one of a start signal, a first clock signal and a second clock signal.

It will be apparent to those skilled in the art that the present disclosure described above is not limited by the above-described aspects and the accompanying drawings and that various substitutions, modifications and variations may be made in the present disclosure without departing from the spirit or scope of the disclosures. Consequently, the scope of the present disclosure is defined by the accompanying claims and it is intended that all variations or modifications derived from the meaning, scope and equivalent concept of the claims fall within the scope of the present disclosure.

What is claimed is:

1. A gate driving circuit controlling driving of a pixel circuit of a display apparatus and including a plurality of stages, the each stage comprising:

a first mode controller configured to output a first emission signal based on a potential of a first node and a potential of a second node to a first output line in response to reception of a first mode signal;

a second mode controller configured to output a second emission signal based on the potential of the first node and the potential of the second node to a second output line in response to reception of a second mode signal;

a node controller configured to control the potential of the first node and the potential of the second node by using at least one of a start signal, a first clock signal and a second clock signal, the potential of the first node and the potential of the second node being input to the first mode controller and the second mode controller, and a common signal controller outputting a common emission signal to a third output line based on the potential of the first node and the potential of the second node, wherein:

the first mode controller includes a first mode control transistor connected to a first mode signal line providing the first mode signal, the first mode signal being a signal of a first viewing angle mode, the second mode controller includes a second mode control transistor connected to a second mode signal line providing the second mode signal, the second mode signal being a signal of a second viewing angle mode different from the first viewing angle mode, and the first mode controller, the second mode controller, and the common signal controller commonly input the potential of the first node and the potential of the second node.

2. The gate driving circuit of claim 1, wherein the first mode controller further includes:

a first transistor connected between the first output line and a first voltage line providing a voltage of a first value; and a second transistor controlled by the potential of the second node and connected between the first output line and a second voltage line providing a voltage of a second value higher than the first value, wherein the first mode control transistor is controlled by the first mode signal and is connected between the first node and a gate electrode of the first transistor.

3. The gate driving circuit of claim 2, wherein the first mode controller further includes:

a third transistor controlled by a reset voltage to initialize the first output line of the first mode controller;

a first capacitor connected to a gate electrode of the first transistor; and a second capacitor connected to a gate electrode of the second transistor.

4. The gate driving circuit of claim 3, wherein the second capacitor has a first electrode connected to a first electrode of the second transistor, and the second capacitor has a second electrode connected to a gate electrode of the second transistor.

5. The gate driving circuit of claim 2, wherein the node controller includes:

a ninth transistor controlled by the second clock signal and connected to a line providing the start signal;

a tenth transistor controlled by the first clock signal and connected to the ninth transistor;

an eleventh transistor connected to the tenth transistor and the second voltage line;

a twelfth transistor controlled by the second clock signal and connected to the first voltage line;

a thirteenth transistor connected to the second voltage line and the second node;

a fourteenth transistor controlled by the first clock signal and connected to the second node; and a fifteenth transistor connected to the ninth transistor, the tenth transistor, the twelfth transistor, the thirteenth transistor and the first node.

6. The gate driving circuit of claim 5, wherein the node controller further includes:

a sixteenth transistor connected to the tenth transistor, the fourteenth transistor and the fifteenth transistor; and a node control capacitor connected to the fourteenth transistor, the fifteenth transistor and the sixteenth transistor.

7. The gate driving circuit of claim 5, wherein the fifteenth transistor includes a dual gate.

8. The gate driving circuit of claim 2, wherein the first mode controller further includes a seventeenth transistor controlled by the first mode signal and connected to the second node and the second transistor.

9. The gate driving circuit of claim 1, wherein the second mode controller further includes:

a fourth transistor connected to a first voltage line providing a voltage of a first value; and a fifth transistor connected to a second voltage line providing a voltage of a second value higher than the first value, wherein the second mode control transistor is controlled by the second mode signal and is connected between the first node and a gate electrode of the fourth transistor.

10. The gate driving circuit of claim 9, wherein the second mode controller further includes:

a sixth transistor controlled by a reset voltage to initialize the second output line of the second mode controller;

a third capacitor connected to a gate electrode of the fourth transistor; and a fourth capacitor connected to a gate electrode of the fifth transistor.

11. The gate driving circuit of claim 9, wherein the second mode controller further includes an eighteenth transistor controlled by the second mode signal and connected to the second node and the fifth transistor.

12. The gate driving circuit of claim 1, wherein the first mode controller controls a first light emission control transistor connected to a first light emitting element in the pixel circuit, and the second mode controller controls a second light emission control transistor connected to a second light emitting element in the pixel circuit.

13. The gate driving circuit of claim 12, further comprising:

a first lens disposed on the first light emitting element; and a second lens disposed on the second light emitting element.

14. The gate driving circuit of claim 13, wherein a viewing angle of an area in which the first light emitting element is disposed corresponds to a first value by the first lens, and a viewing angle of an area in which the second light emitting element is disposed corresponds to a second value smaller than the first value by the second lens.

15. The gate driving circuit of claim 1, wherein the common signal controller includes:

a seventh transistor controlled based on the potential of the first node and connected to the third output line; and an eighth transistor controlled based on the potential of the second node and connected to the third output line.

16. The gate driving circuit of claim 15, wherein the common signal controller further includes:

a fifth capacitor connected to the first node; and a sixth capacitor connected to the second node.

17. The gate driving circuit of claim 15, wherein the common signal controller further includes a reset transistor controlled by a reset voltage and configured to reset the common signal controller.

18. The gate driving circuit of claim 15, wherein the common signal controller further includes a first common control transistor controlled by a common control signal and connected to a gate electrode of the seventh transistor.

19. The gate driving circuit of claim 18, wherein the common signal controller further includes a second common control transistor controlled by the common control signal and connected to a gate electrode of the eighth transistor.

20. The gate driving circuit of claim 1, wherein the start signal includes at least one emission signal output from a previous stage.

21. The gate driving circuit of claim 1, further comprising a scan output unit outputting a scan signal.

22. The gate driving circuit of claim 1, wherein the start signal includes an external start signal and at least one emission signal output from a previous stage.

23. A display panel comprising:

a plurality of pixel circuits; and a gate driving circuit configured to control driving of the plurality of pixel circuits based on supply of a first emission signal and a second emission signal to each of the plurality of pixel circuits, wherein the gate driving circuit includes a plurality of stages and each stage includes:

a first mode controller configured to output the first emission signal based on a potential of a first node and a potential of a second node to a first output line in response to reception of a first mode signal;

a second mode controller configured to output the second emission signal based on the potential of the first node and the potential of the second node to a second output line in response to reception of a second mode signal;

a controller configured to control the potential of the first node and the potential of the second node by using at least one of a start signal, a first clock signal and a second clock signal, the potential of the first node and the potential of the second node being input to the first mode controller and the second mode controller, and a common signal controller outputting a common emission signal to a third output line based on the potential of the first node and the potential of the second node, wherein:

the first mode controller includes a first mode control transistor connected to a first mode signal line providing the first mode signal, the first mode signal being a signal of a first viewing angle mode, the second mode controller includes a second mode control transistor connected to a second mode signal line providing the second mode signal, the second mode signal being a signal of a second viewing angle mode different from the first viewing angle mode, the first mode controller, the second mode controller, and the common signal controller commonly input the potential of the first node and the potential of the second node.

24. A display apparatus disposed in at least a portion of a transport means, providing at least one content, the display apparatus comprising:

a plurality of pixel circuits; and a gate driving circuit configured to control driving of the plurality of pixel circuits based on supply of a first emission signal and a second emission signal to each of the plurality of pixel circuits, wherein the gate driving circuit includes a plurality of stages and each stage includes:

a first mode controller configured to output the first emission signal based on a potential of a first node and a potential of a second node to a first output line in response to reception of a first mode signal;

a second mode controller configured to output the second emission signal based on the potential of the first node and the potential of the second node to a second output line in response to reception of a second mode signal;

a controller configured to control the potential of the first node and the potential of the second node by using at least one of a start signal, a first clock signal and a second clock signal, the potential of the first node and the potential of the second node being input to the first mode controller and the second mode controller, and a common signal controller outputting a common emission signal to a third output line based on the potential of the first node and the potential of the second node, wherein:

the first mode controller includes a first mode control transistor connected to a first mode signal line providing the first mode signal, the first mode signal being a signal of a first viewing angle mode, the second mode controller includes a second mode control transistor connected to a second mode signal line providing the second mode signal, the second mode signal being a signal of a second viewing angle mode different from the first viewing angle mode, the first mode controller, the second mode controller, and the common signal controller commonly input the potential of the first node and the potential of the second node.

* * * * *